(12) United States Patent
O'Meara

(10) Patent No.: US 6,295,007 B1
(45) Date of Patent: Sep. 25, 2001

(54) LASER LIGHTING SYSTEM

(76) Inventor: James C. O'Meara, 3811 W. 72nd Ct., Anchorage, AK (US) 99502

(*) Notice: Subject to any disclaimer, the term of this patent is extended or adjusted under 35 U.S.C. 154(b) by 0 days.

(21) Appl. No.: 09/649,506

(22) Filed: Aug. 28, 2000

Related U.S. Application Data

(63) Continuation-in-part of application No. 09/212,253, filed on Dec. 16, 1998, now Pat. No. 6,163,247, which is a continuation-in-part of application No. 09/149,180, filed on Sep. 8, 1998, now Pat. No. 6,007,219, which is a continuation-in-part of application No. 08/992,584, filed on Dec. 17, 1997, now abandoned.

(51) Int. Cl.[7] ................................................. G08G 5/00
(52) U.S. Cl. ................................ 340/953; 73/178 T
(58) Field of Search .................. 340/984, 947, 340/948, 952, 953, 956, 321, 908.1, 985; 362/62, 470; 73/178 T; 356/256, 4.01

(56) References Cited

U.S. PATENT DOCUMENTS

| | | | | |
|---|---|---|---|---|
| H1231 | * | 9/1993 | Richards | 356/5 |
| 3,611,277 | * | 10/1971 | Yoder . | |
| 4,025,193 | * | 5/1977 | Pond et al. | 356/5 |
| 4,099,591 | * | 7/1978 | Carr | 180/98 |
| 4,925,303 | * | 5/1990 | Pusic | 356/152 |
| 5,959,734 | * | 9/1999 | Tanaka et al. | 356/375 |
| 6,008,900 | * | 12/1999 | Green et al. | 356/345 |
| 6,028,624 | * | 2/2000 | Watkins | 348/122 |

* cited by examiner

Primary Examiner—Brent A. Swarthout
(74) Attorney, Agent, or Firm—Richard C. Litman

(57) ABSTRACT

A laser lighting system of beam shaping, delivery, and the retroreflection of laser light on specially designed markers to reduce the problems associated with the illumination of markings, signage, and reflectors installed in northern climates. The laser lighting system employs employ visible and reflective laser beam lighting sources to provide illumination of airport runways and taxiways, preferred approach and departure routes, seaplane base landing areas, marine waterways, as well as to assist in search and rescue operations. The laser lighting system may be a laser lighting post or a laser lighting unit for providing radiation along a surface that includes at least one laser for producing a beam of coherent visible or reflective radiation, and a glass planoconvex cylindrical lens which has an aspherical convex cylindrical surface for generating a laser line which is uniformly illuminated from end to end. The laser lighting post includes a mounting column which has an access door for providing access to a tilt switch assembly and an AC/DC power adapter unit. The mounting column is attached to a base plate by a frangible coupling. The laser lighting system also includes an omni-directional, retroreflective marker which is not permanently installed thus making replacement, maintenance and snow removal much easier.

8 Claims, 36 Drawing Sheets

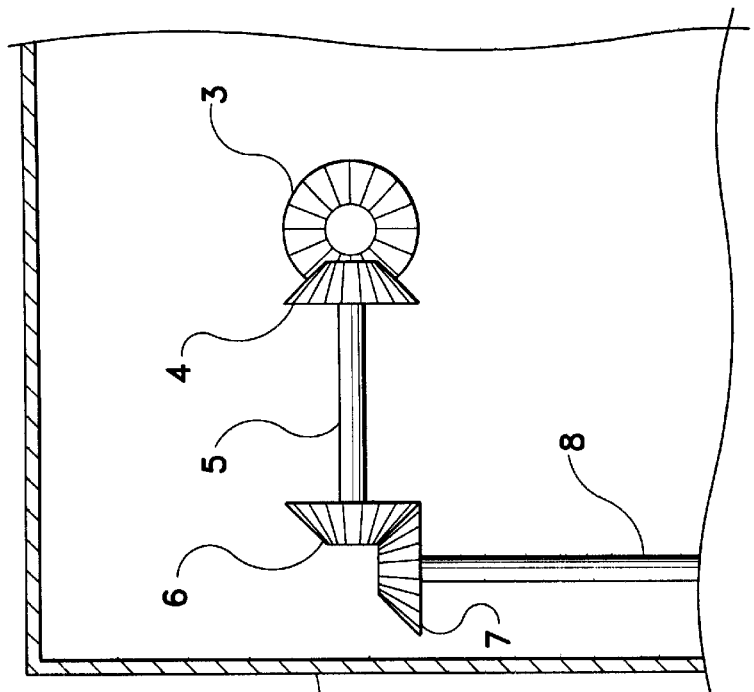
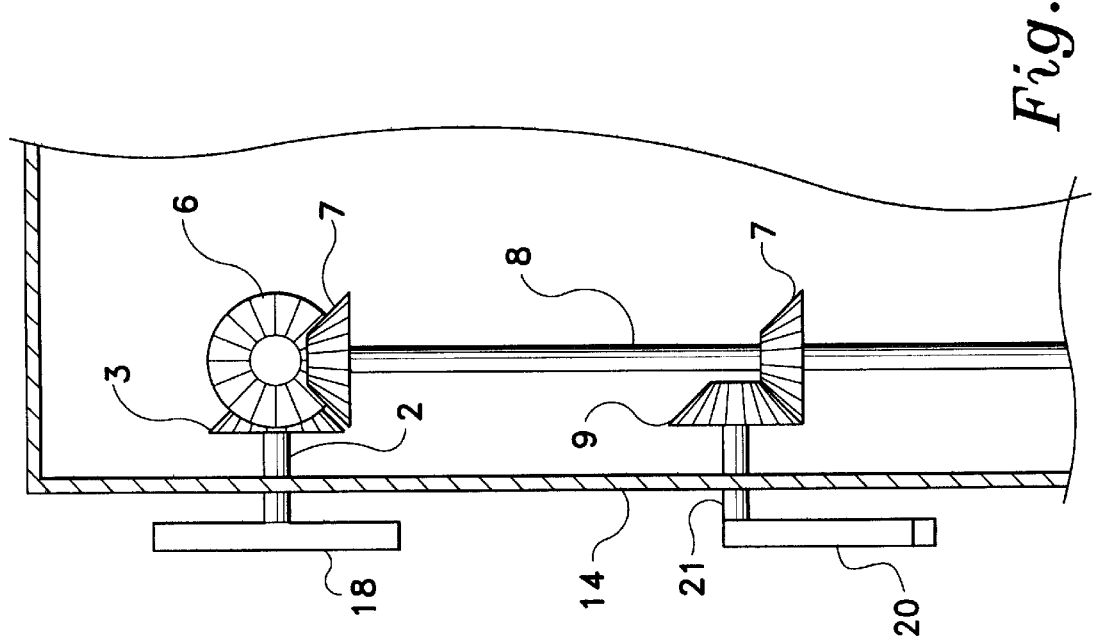
Fig. 4B
Fig. 4A

LASER LIGHTING SYSTEM

CROSS REFERENCE TO RELATED APPLICATIONS

This is a continuation-in-part of application Ser. No. 09/212,253 filed on Dec. 16, 1998, now U.S. Pat. No. 6,163,247 which is a continuation-in-part of application Ser. No. 09/149,180 filed on Sep. 8, 1998, now U.S. Pat. No. 6,007,219, which is continuation-in-part of application Ser. No. 08/992,584 filed on Dec. 17, 1997, now abandoned.

BACKGROUND OF THE INVENTION

1. Field of the Invention

The present invention relates to lighting sources which employ visible and reflective laser beams to provide illumination of airport runways and taxiways, preferred approach and departure routes, helipads, seaplane base landing areas, marine waterways, as well as to assist in search and rescue operations.

2. Description of the Related Art

Many airports handle different types of aircraft ranging from highly sophisticated and complex military aircraft and commercial airliners to ultra-simple single engine airplanes with little in the way of navigation or communication capabilities. Further, the pilot's experience and ability associated with these different aircraft also varies greatly. Edges and center lines of runway and taxiways are typically illuminated with individual incandescent lamps of comparatively high candle power. The type of illumination utilized in many previous systems exhibited a comparatively high installation cost. The power requirements for such prior system also were excessive, and the systems were expensive to maintain The construction and maintenance of a standard electric illuminating system in certain areas is not always practical Federal Regulations require these areas to be "lit" for night operations. This invention uses lighting sources which employ visible and reflective laser beams to provide illumination airport runways and taxiways, preferred approach and departs routes, seaplane base landing areas, marine waterways, as well to assist in search and rescue operations.

The related art is represented by the following patents interest.

U.S. Pat. No. 3,407,294, issued on Oct. 22, 1968 to Alan E. Hill, describes a method for redistributing laser light into a non-coherent uniform beam while retaining other property of laser light. Hill does not suggest a laser lighting system according to the claimed invention.

U.S. Pat. No. 3,710,098, issued on Jan. 9, 1973 to Noel H. F. Walden, describes a swept-beam visual light assembly including a laser light source, a beam collimator, and a beam-sweeping means. Walden does not suggest a laser lighting system according to the claimed invention.

U.S. Pat. No. 3,866,032, issued on Feb. 11, 1975 to Raymond M. Veres, describes an illumination system for providing center and edge stripes for an airport runway, in which six laser generating stations are respectively arranged in with relationship with the ends of the proposed stripes. Veres does not suggest a laser lighting system according to the claimed invention.

U.S. Pat. No. 4,145,111, issued on Mar.20, 1979 to Hans Hansson et al., describes an omnidirectional retroreflector assembly that can be attached to an aircraft structure designed for carrying external loads such as bombs and rocket missiles, enable a combat aircraft to be quickly and easily converted for service as a target for anti-aircraft gunnery practice with laser equipment of the above described type. Hansson et al. do not suggest a laser lighting system according to the claimed invention U.S. Pat. No. 4,185,891, issued on Jan. 29, 1980 Paul Kaestner, describes a laser diode optical collimating system. Kaestner does not suggest a laser lighting system according to the claimed invention.

U.S. Pat. No. 4,291,294, issued on Sep. 22, 1981 Wendell D. Chase, describes a landing approach lighting system which utilizes red warning lights to delineate the runway approach additional blue lights juxtaposed with the red lights such that the red lights are chromatically balanced. Chase does not suggest a laser lighting system according to the claimed invention.

U.S. Pat. No. 4,551,726, issued on Nov. 5, 1985 to Richard M. Berg, describes methods for making and assembling various orthogonal multifaceted polydeltatrihedral self-supportable corner reflectors. Berg does not suggest a laser lighting system according to the claimed invention.

U.S. Pat. No. 4,554,543, issued on Nov. 19, 1985 to Ivan S. Wyatt et al., describes a glide slope indicator system which light from an incoming aircraft's landing light is shaped a spherical/cylindrical lens combination into a line image which strikes a linear photodiode array. Wyatt et al. do not suggest a laser lighting system according to the claimed invention.

U.S. Pat. No. 4,700,912, issued on Oct. 20, 1987 to Marshall J. Corbett, describes a laser system for illuminating a column of air which captures an aircraft thereby enabling; a pilot to see the air column and "bucket" during take-off and landing Corbett does not suggest a laser lighting system according to the claimed invention.

U.S. Pat. No. 4,707,696, issued on Nov. 17, 1987 to Harry L. Task et al., describes a portable glide slope indicator including a pair of light sources, one projecting a steady beam and one projecting a blinking beam. Task et al. do not suggest a laser lighting system according to the claimed invention.

U.S. Pat. No. 4,790,402, issued on Dec. 13, 1988 to Bruce F. Field et al., describes an unmanned, self-propelled vehicle in the nature of a mobile robot that has an on-board computer that stores path and machine function instructions and activates the drive and steering systems so as to cause the machine to follow a desired path. Field et al. do not suggest a laser lighting system according to the claimed invention.

U.S. Pat. No. 4,862,164, issued on Aug. 29, 1989 to Henry C. Croley et al., describes a portable infrared landing site illumination system for fixed wing and rotary wing aircraft having night vision capabilities as provided by the Army's second generation goggles (PVS-5) or the third generation goggles (ANVIS). Croley et al. do not suggest a laser lighting system according to the claimed invention.

U.S. Pat. No. 4,969,713, issued on Nov. 13, 1990 to Charles W. Wyckoff, describes a direction-indicating surface marke strip comprising a bottom rubber-like (non-memory) surface for adhering to a roadway and an upper crosslinked plastic elastomeric self-restoring (polyurethane, PVC, polycarbonate, epoxy, rubber etc.) surface. Wyckoff does not suggest a laser lighting system according to the claimed invention.

U.S. Pat. No. 5,115,343, issued on May 19, 1992 to Reginald S. Bennett, describes a truncated pyramidal pylon useful for aiding night landing of helicopters or fixed wing aircraft but also useful as an emergency marker to be carried in ambulances, or other emergency vehicles. Bennett does not suggest a laser lighting system according to the claimed invention.

U.S. Pat. No. 5,172,267, issued on Dec. 15, 1992 to Eli Yablonovitch, describes an omnidirectional optical reflector structure made by forming a plurality of holes in a solid body so as to result in a face-centered cubic lattice. Yablonovitch does not suggest a laser lighting system according to the claimed invention.

U.S. Pat. No. 5,202,742, issued on Apr. 13, 1993 to Andrew A. Frank et al., describes a laser radar apparatus for producing a pulse modulated transmitted light beam and receiving reflected light beams from road mounted retroreflectors. Frank et al. do not suggest a laser lighting system according to the claime invention.

U.S. Pat. No. 5,293,162, issued on Mar. 8, 1994 to William D. Bachalo, describes a laser tracking device which includes a laser generation apparatus for generating and transmitting a laser beam. Bachalo does not suggest a laser lighting system according to the claimed invention.

U.S. Pat. No. 5,371,581, issued on Dec. 6, 1994 to Richard J. Wangler et al., describes a helicopter hazardous ground object warning system that has a horizontally rotating beam from laser range-finder which detects and measures the distance to ground objects which may present a hazard to a helicopter during hover, takeoff, and landing. Wangler et al. do not suggest a laser lighting system according to the claimed invention.

U.S. Pat. No. 5,416,636, issued on May 16, 1995 to Reginald S. Bennett, describes a runway marker which has a pair of upwardly converging reflectant planar panels facing approximated in opposite directions. Bennett '636 does not suggest a laser lighting system according to the claimed invention.

U.S. Pat. No. 5,531,402, issued on Jul. 2, 1996 to Robert M. Dahl, describes a wireless flight control system. Dahl does not suggest a laser lighting system according to the claimed invention U.S. Pat. No. 5,584,137, issued on Dec. 17, 1996 to James W. Teetzel, describes a laser sight which fits conventions handguns and rifles without requiring major modifications of the weapons and yet fits within the profile of the weapons framework Teetzel does not suggest a laser lighting system according to the claimed invention.

U.S. Pat. No. 5,593,114, issued on Jan. 14, 1997 to Louis F. Ruhl, describes an landing system which allows the pilot to view the approach scene with the use of a forward looking radar or equivalent sensor which provides the means of identifying the runways and the airport and land the aircraft using the automatic landing systems on virtually all types of aircraft. Ruhl does not suggest a laser lighting system according to the claimed invention U.S. Pat. No. 5,680,120, issued on Oct. 21, 1997 Michael M. Tilleman, describes an electro-optic transportation warning system which operates by transmitting an optical signal from a moving vehicle through air to a fiberoptic cable relay, one end of which comprises a collimating means to receive the outgoing optical signal and the other end of which is connected to a probe means to scan a given air path which is out of the direct line-of-site of the moving vehicle. Tilleman does not suggest laser lighting system according to the claimed invention.

U.S. Pat. No. 5,719,568, issued on Feb. 17, 1998 to Peter J. Adams, describes a device which indicates the clearance requirements of an aircraft maneuvering on a surface such as apron, taxiway, or flight deck. Adams does not suggest a laser lighting system according to the claimed invention.

U.S. Pat. No. 5,909,062, issued on Jun. 1, 1999 to Mark H. Krietzman, describes a secondary power supply for use with handheld illumination devices. Krietzman does not suggest a laser lighting system according to the claimed invention.

U.S. Pat. No. 5,916,285, issued on Jun. 25, 1999 to Cornell W. Alofs et al., describes a vehicle comprising a navigation and guidance system for guiding the vehicle based on information supplied by a first device that senses the heading change of the vehicle and a second device that measures all movement of the vehicle along the surface the vehicle is traversing. Alofs et al. do not suggest a laser lighting system according to the claimed invention.

U.S. Pat. No. 5,975,706, issued on Nov. 2, 1999 to Naoki Nakayama, describes a wide incident angle reflective plate comprising a laminate of a substrate and retroreflective sheet adhered to the surface of the substrate, which plate is used for improving visibility at night. Nakayama does not suggest a laser lighting system according to the claimed invention.

U.S. Pat. No. 5,997,163, issued on Dec. 7, 1999 to David C. Brown, describes a laser spotlight system which illuminates an ambient environment while minimizing the risk of causing irreversible eye damage when gazed upon. Brown does not suggest a laser lighting system according to the claimed invention Canada Patent document 2,015,859, issued on Jul. 24, 1991, describes a truncated pyramidal pylon useful for aiding night landing of helicopters or fixed wing aircraft but also useful as an emergency marker to be carried in ambulances, or other emergency vehicles. Canada '859 does not suggest a laser lighting system according to the claimed invention.

European Patent document 0 076 243 A1, published on Apr. 6, 1983, describes an omnidirectional reflector adapted to embrace as a continuous unit a light source situated in the center of the reflector. European '243 does not suggest a laser lighting system according to the claimed invention.

European Patent document 0 102 931 A1, published on Mar. 14, 1984, describes an omnidirectional reflector having a light source situated in the center thereof. European '931 does not suggest a laser lighting system according to the claimed invention.

European Patent document 0 171 030 A1, published on Feb. 12, 1986, describes a retroreflective road-marking stud having constant omnidirectional effect, which is self-cleaning and can be renewed on the road without exchanging the reflector. European '931 does not suggest a laser lighting system according to the claimed invention.

European Patent document 0 283 441 A2, published on Sep. 21, 1988, describes a lighting system employing light sources and prism elements. European '441 does not suggest a laser lighting system according to the claimed invention.

European Patent document 0 807 830 A1, published on Nov. 19, 1997, describes a vehicle-mounted optical radar including semiconductor laser, a photodetector, and an optical beam forming system having two curved mirrors. European '830 does not suggest a laser lighting system according to the claimed invention.

Great Britain Patent Application Number 2,202,980 A, publish on Oct. 5, 1988, describes a flight path indicator including a plurality of individual light sources, beam-forming means for directing light from each of the light sources through a respective color filter and lens system to produce a plurality of differently colored diverging light beams and means for directing the beams at different inclinations to define different angular sectors. Great is Britain '980 does not suggest a laser lighting system according the claimed invention.

International Patent document WO 92/04232, published on May. 19, 1992, describes a marker light for airfields that includes light source and a prism so as to provide two light beams with a desired elevational angle relative to the ground level plane. International '232 does not suggest a laser lighting system according to the claimed invention.

International Patent document WO 99/26214, published on May 27, 1999, describes an optical hazard detection system for aircraft based on a dynamic parallax mechanism to alert the pilot of an object in the flight path by a selected amount of time in advance. International '214 does not suggest a laser lighting system according to the claimed invention.

None of the above inventions and patents, taken either singularly or in combination, is seen to describe the instant invention as claimed.

SUMMARY OF THE INVENTION

The present invention addresses a system of beam shaping, delivery, and the retroreflection of laser light on specially designed markers to reduce the problems associated with the illumination of markings, signage, and reflectors installed in northern climates.

The present invention is a laser lighting system which employs visible and reflective laser beam lighting sources to provide illumination of airport runways and taxiways, preferred approach and departure routes, seaplane base landing areas, marine waterways, as well as to assist in search and rescue operations. One inventive laser lighting system includes three laser radiation stations at either end of a runway. The runway additionally includes a plurality of reflectors, however these are not required. The reflectors are fabricated from reflectorizing material. The three laser radiation stations at either end of the runway are respectively positioned in spaced relation and in line with the edges and the centerline of the runway. Each radiation station can be activated manually or by remote control radio signals using standard five click switching devices.

Each radiation station includes a plurality of laser generators, preferably three or more. The placement of these laser generators are well below the glide path of landing aircraft at sufficient height for each of the laser generators to strike all of the reflectors including the threshold markers and runway end identifiers. The laser generators are powered by conventional power supplies. However, the laser generators may also be powered by a storage battery recharged by a solar panel. The laser generators may be shielded with adjustable shields so as to project light only on desired targets. The shields are adjusted through the rotation of vernier adjusters.

Each laser generator is of conventional construction and typically comprises a mixed gas or diode laser. Each generator produces either a rotating, oscillating; or refractive laser. A refractive laser comprises a fixed laser generator equipped with prism lens, preferably a line generator optics lens, which results in transmission of a vertical beam of light. The line generating optics is preferably a glass plano-convex cylindrical lens of which the cylindrical convex surface is aspherical rather than spherical in shape in order to eliminate spherical aberration in the lens. With a standard spherical or rod lens, the projected laser line results in a Gaussian line, i.e. brighter in the center and dim at the outer ends. When this spherical curve is altered, or aspherized, to the proper parameters, the resultant projected laser line becomes uniformly illuminated from end to end. Each generator produces a beam of coherent visible radiation from about 400 to about 700 nanometers, preferably in the range of 488 to 670 nanometers, having a diameter of the order 1.5 millimeters. The laser beam preferably is green in color for maximum visibility.

A laser lighting post according to the invention for providing radiation along a surface includes one laser for producing a beam of coherent visible or reflective radiation, and a glass plano-convex cylindrical lens which has an aspherical convex cylindrical surface for generating a laser line which is uniformly illuminated from end to end. The laser lighting post also includes a mounting column which has an access door for providing access to a tilt switch assembly and an AC/DC power adapter unit. The mounting column is attached to a base plate by a frangible coupling.

A laser lighting unit according to the invention for providing radiation along a surface includes at least one laser for producing a beam of coherent visible or reflective radiation, and a glass plano-convex cylindrical lens which has an aspherical convex cylindrical surface for generating a laser line which is uniformly illuminated from end to end. The laser lighting unit may also include a case containing a flashlight light bulb, at least one battery, and laser switch means for selectively energizing the laser via the at least one battery. The laser lighting unit also includes a light bulb switch means for selectively energizing the light bulb via the at least one battery. The laser lighting unit may also include an enlarged end to form a head having a front opening which is spanned by a parent lens. The laser lighting unit may also include a parabolic reflector.

A laser scanning device according to the invention can be mounted to any motorized vehicle. This laser scanning system incorporates a laser, a glass plano lens, a fixed mirror, an oscillating mirror, a temperature controlling device, a case, a clear glass cover, and a mounting means for securing the device to a motorized vehicle such as an aircraft, helicopter, truck automobile, boat, or the like. This laser device may also be hand held and used from these vehicles for the purpose of illuminating Power is supplied from a power source through a power connector to a laser. The laser outputs radiation which passes through a lens and is generated into a horizontally expanding line beam of radiation that strikes an oscillating mirror. A vertically oscillating, horizontally expanding line beam of radiation that reflects off of the oscillating mirror is reflected off of a fixed mirror. The horizontal expansion of the line beam of radiation is regulated by changing the angle ground on a glass plano lens or by adjusting the distance of the laser and the lens from the oscillating mirror, and by adjusting the distance of the oscillating mirror from the fixed mirror. Changes to the horizontal and/or vertical radius of the fixed mirror will further regulate the vertical oscillation and the horizontal expansion of the line generated beam of radiation. The vertical oscillation of the horizontally expanding beam of radiation is controlled by the distance of the oscillating mirror from the fixed mirror. The frequency of the vertical oscillations is controlled by regulation of the voltage applied to the oscillating mirror driver. direction of the vertically oscillating, horizontally expanding beam of radiation emitted through the heated glass window of the mounted laser scanner can be regulated by adjusting the angle of the vertical oscillating mirror to the fixed mirror on the horizontal plane. The vertically oscillating horizontally expanding line beam of radiation is subsequently reflected through a heated glass window. A temperature control regulates the temperature of the heated glass window to clear ice and frost from the glass window.

The laser scanning device is configured for use with an omnidirectional, retroreflective marker which is not permanently installed thus making replacement, maintenance and snow removal much easier. Such a marker is held in place by attaching a strap with a frangible connector to protruding cable loops that are anchored above or below the surface at specific intervals. The strap goes through a small opening in the top of the reflector and is cinched down by a special friction device on the strap. The placement of this omnidirectional retroreflector marker is not dependent on a specific alignment and is easily re-installed upon completion of the snow removal or construction process. The protruding cable loops are not affected by the snow removal equipment and remain visible to reattach the reflectors in the proper location. Should the retroreflective markers be removed from the location the cable loops are easily removed from the surface.

The omnidirectional, retroreflective marker used with the laser scanning device has a conical shape with a rounded top to shed any accumulation of snow. This shape has a large surface area to apply retroreflective tapes or paints. The omnidirectional retroreflective marker incorporates in its design large open areas at the base of the marker. This feature eliminates snow drifting as the wind is allowed to carry the airborne snowflakes through the marker and beyond rather than accumulate as a snowdrift in the dead air space behind the marker. These omnidirectional retroreflective markers will work in any climate on land or water, above and below the surface. The reflector incorporates a locking mechanism that allows the strap to be tightened or cinched in one direction. A push to release feature unlocks the strap. This strap is made of nylon webbing and is preferably orange in color for identification. The basic shape of the omnidirectional retroreflective marker is conical to provide structural integrity and shed snow accumulations and provide a large surface area for the application of retroreflective tapes and paint. The measurements are proportionate and they are available in different sizes. The frangible hook is designed to break preventing damage to the reflector or a vehicle, but is strong enough to withstand designed wind loads. The anchor cable is driven into the surface. The frangible hook attaches to the loop formed this cable. The cutout areas in the base of the cone elevate the marker and prevent blowing snow or sand from drifting and accumulating behind the reflector. The remaining bottom portion of the cone form feet that the marker rests on. The frangible hook is attached to the strap. The strap is fed through the strap cinch. The top surface of strap cinch device is covered with retroreflective tape or paint. A cable loop protrudes above the surface. A cable attached to a cable anchor. The cable anchor is driven into the ground.

Accordingly, it is a principal object of the invention to provide a laser lighting device for providing radiation along a surface comprising a laser, a glass plano lens, a fixed mirror, a oscillating mirror, a temperature controlling device, a case, a clear glass cover, power connection means, and a mounting means for securing the device to a motorized vehicle.

It is another object of the invention to provide an omnidirectional, retroreflective marker comprising a conical structure, a locking mechanism, a strap, a strap cinch, an anchor cable, and a frangible hook attached to the strap.

It is an object of the invention to provide improved elements and arrangements thereof in a laser lighting system for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

FIG. 4A is a cutaway side view of one type of vernier adjustment means according to the invention.

FIG. 4B is a cutaway rear view of the vernier adjustment means shown in FIG. 4A.

Similar reference characters denote corresponding features consistently throughout the attached drawings.

DETAILED DESCRIPTION OF THE PREFERRED EMBODIMENTS

Figure 1:
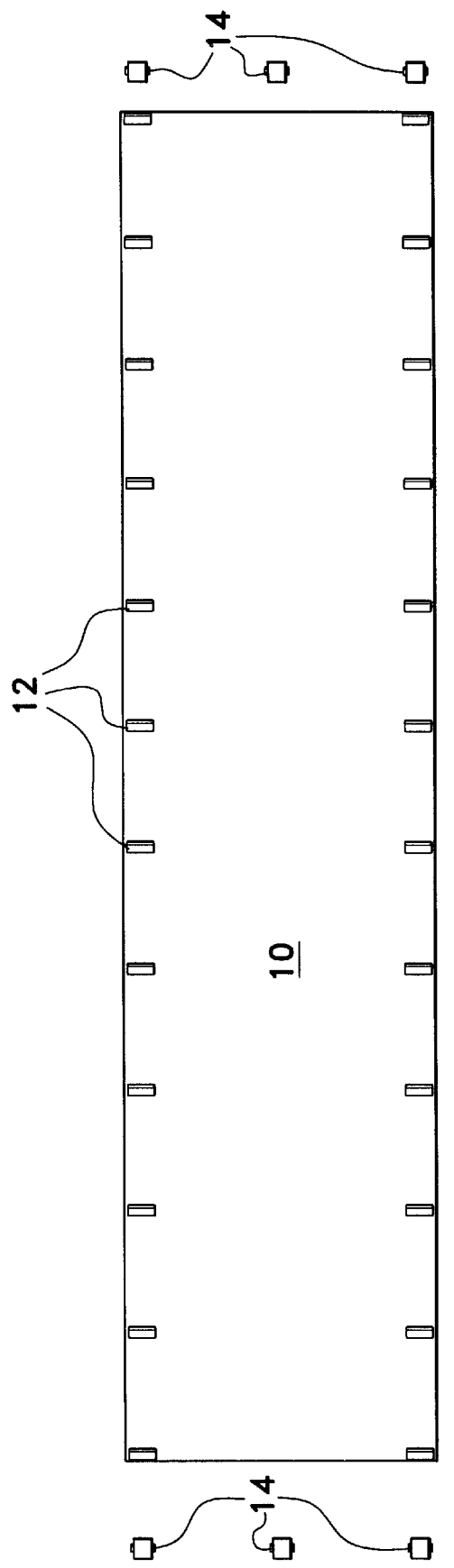
FIG. 1 is a top view of a runway equipped with a laser lighting system according to the present invention.
Figure 2:
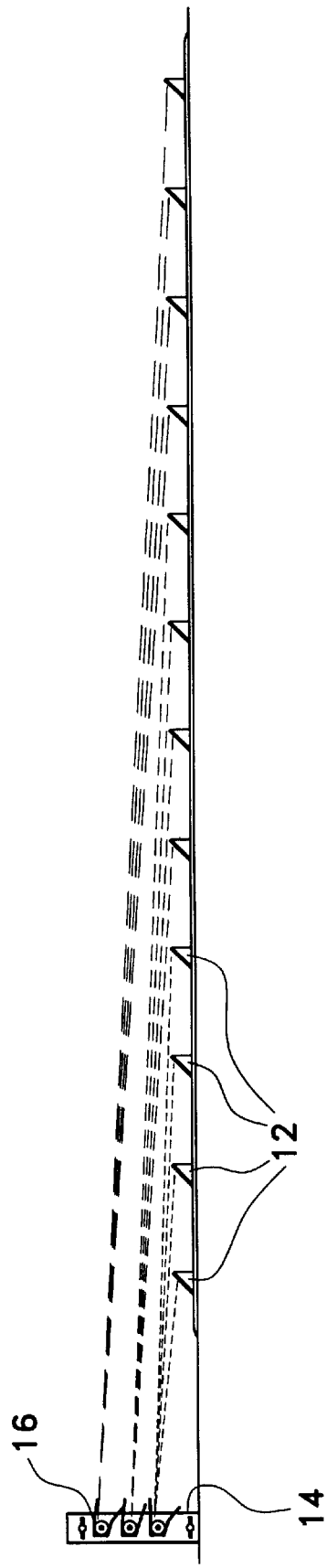
FIG. 2 is a side view of the runway shown in FIG. 1.
Figure 3:
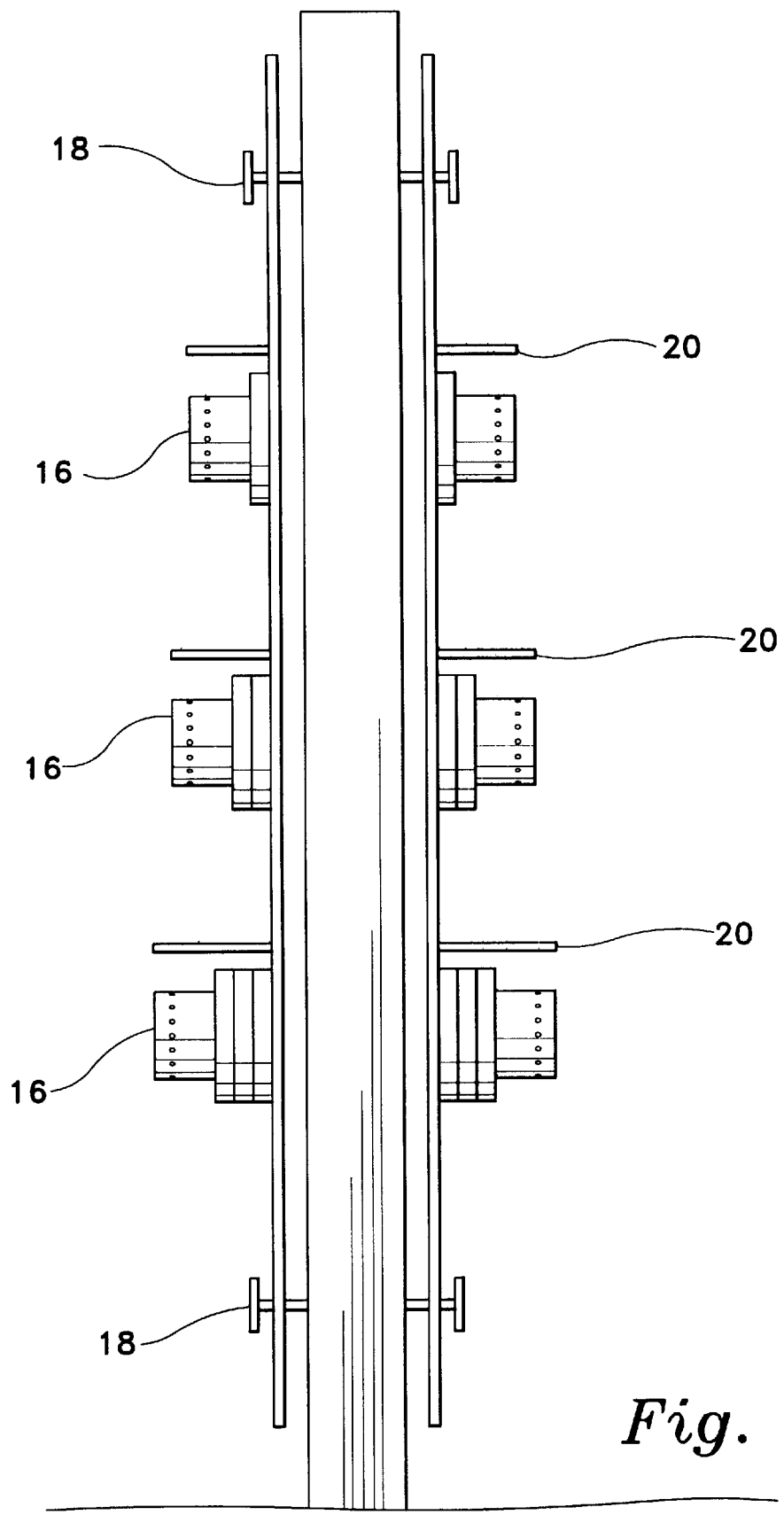
FIG. 3 is a front view of a laser lighting post according to the invention.

The present invention addresses a system of beam shaping, delivery, and the retroreflection of laser light on specially designed markers to reduce the problems associated with the illumination of markings, signage, and reflectors installed in northern climates. The invention disclosed herein is, of course susceptible of embodiment in many different forms. Shown in the drawings and described hereinbelow in detail are preferred embodiments of the invention. It is to be understood, however that the present disclosure is an exemplification of the principle of the invention and does not limit the invention to the illustrated embodiments.

Referring to FIG. 1 of the drawings, there is shown a first runway 10 equipped with a laser lighting system for indicating to incoming aircraft a desired, preferred or required path of travel. The laser lighting system includes three laser radiation stations 14 at either end of the runway 10. The runway 10 additionally includes a plurality of reflectors 12, however these are not required. The reflectors 12 are fabricated from reflectorizing material. The three laser radiation stations 14 at either end of the runway 10 are respectively positioned in spaced relation and in line with the edges and the centerline of the runway 10.

Figure 4:
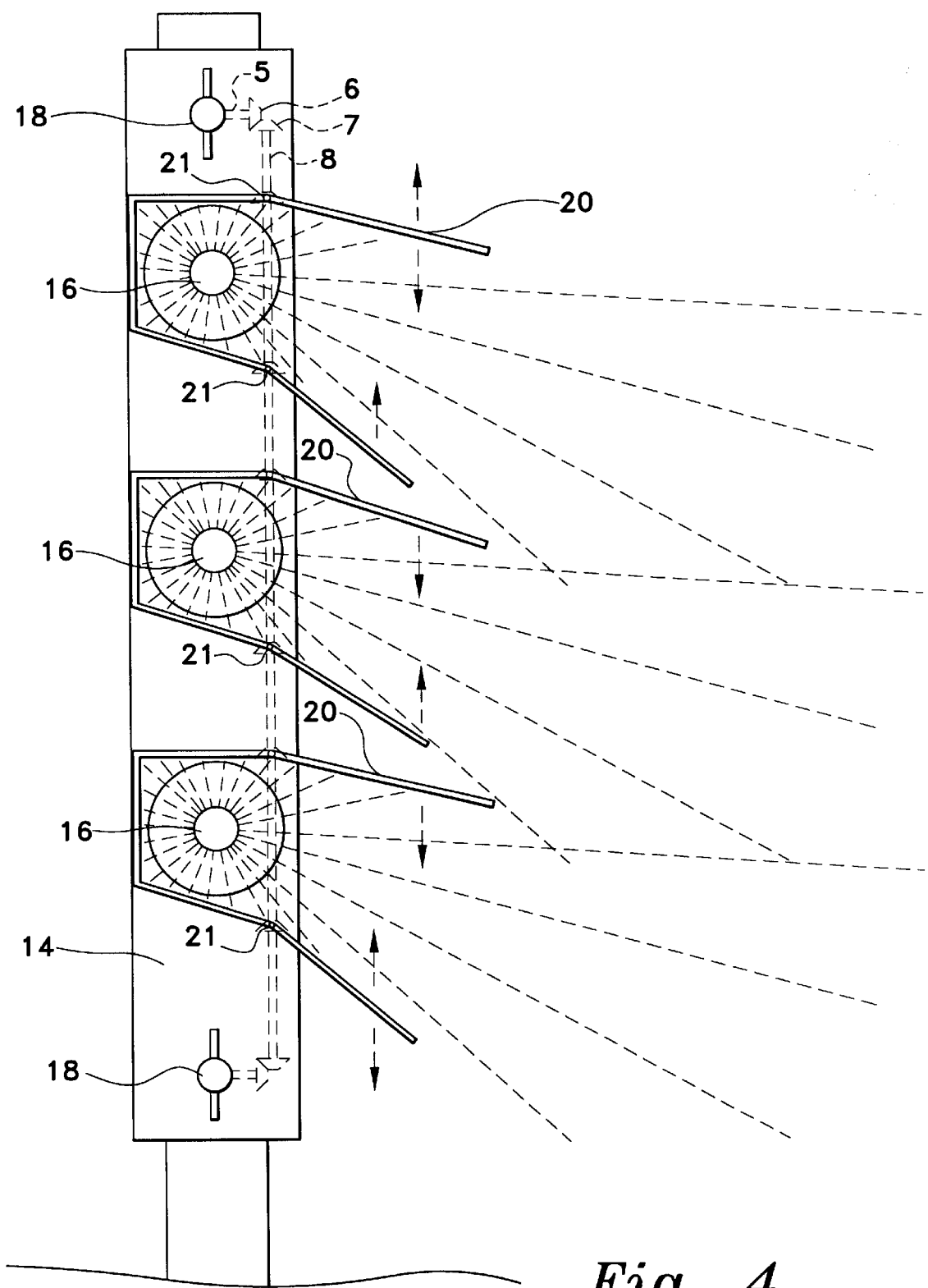
FIG. 4 is a side view of the laser lighting post shown in FIG. 3.

As shown in FIGS. 2–4B, each radiation station 14 includes a plurality of laser generators 16, preferably three or more. The placement of these laser generators 16 are well below the glide path of landing aircraft but at sufficient height for each of the laser generators 16 to strike all of the reflectors 12 including the threshold markers and runway end identifiers. The laser generators 16 are powered by conventional power supplies. The laser generators 16 are shielded with adjustable shields 20 so as to project light only on desired targets. The shields are adjusted through the rotation of vernier adjusters 18. As shown in FIGS. 4A and 4B, rotation of the vernier adjusters 18 effect the pivoting of adjustable shields 20 up or down about pivot points 21. One technique for pivoting the adjustable shields 20 up or down about pivot points 21 includes the use of bevel gears 3, 4, 6, and 7 attached to shafts 2, 5, and 8. However, any means known in the art may be employed to adjust the shields 20 about pivot points 21. The arrival and departure corridors if applicable are indicated by visible lasers projected from similar laser generators. Additional lasers may target reflective devices placed on obstacles such as terrain or obstructions in the vicinity of such airports. The laser generators can be activated manually or by remote control radio signals using standard five click switching devices.

Each laser generator 16 is of conventional construction and typically comprises a mixed gas or diode laser. Each generator 16 produces either a rotating, oscillating, or refractive laser. A refractive laser comprises a fixed laser generator equipped with prism lens, preferably a line generator lens, which results in transmission of a vertical beam of light. Each generator 16 produces a beam of coherent visible radiation from about 400 to about 700 nanometers, preferably in the range of 488 to 670 nanometers, having a diameter of the order 1.5 millimeters. The laser beam preferably is green in color for maximum visibility.

Figure 5:
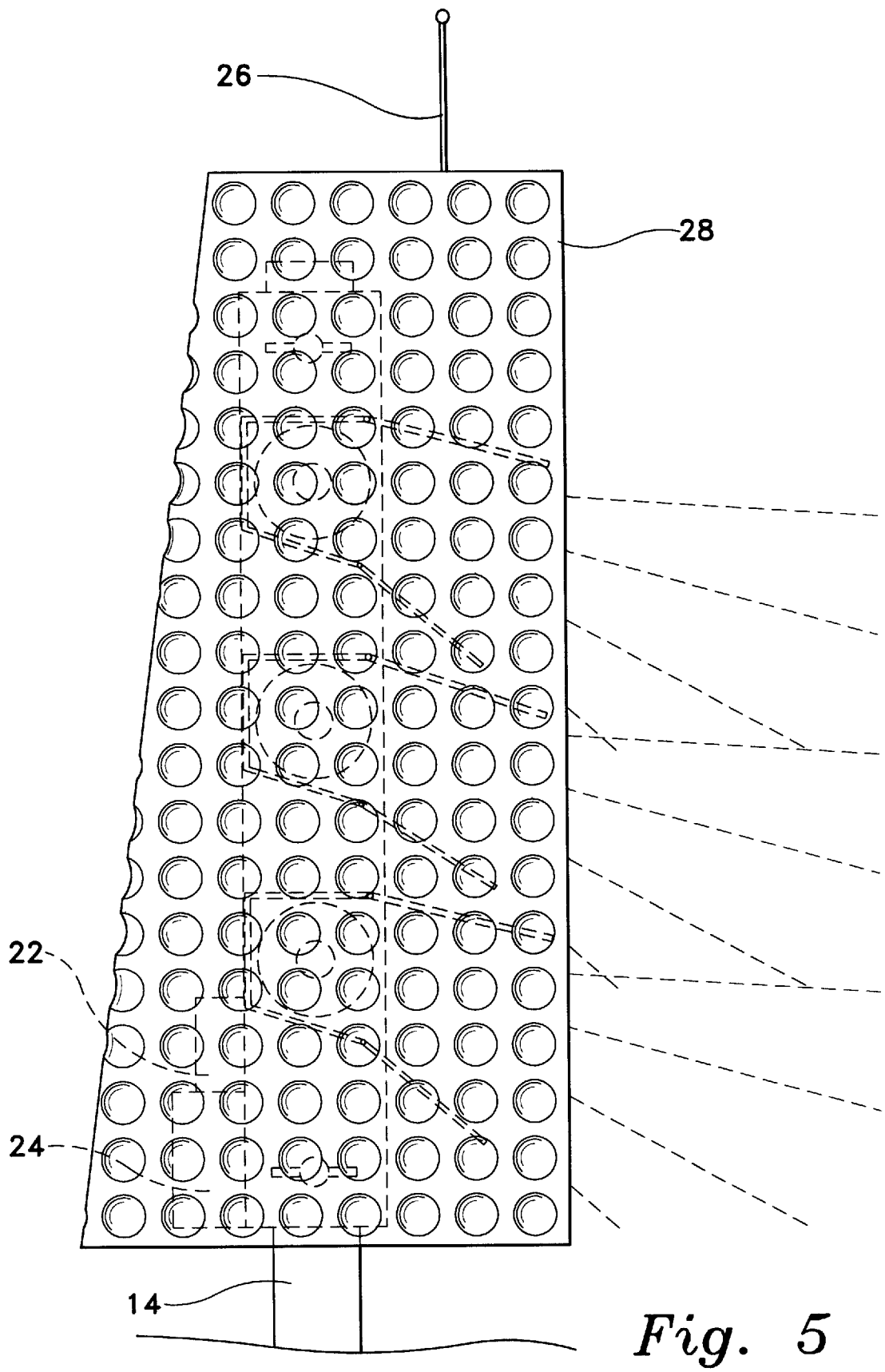
FIG. 5 is a side view of another laser lighting post according to the invention.

FIG. 5 illustrates another laser radiation station according to the invention. The laser radiation station includes a post 14 with a plurality of shielded laser generators mounted thereon similar to the laser radiation stations shown in FIGS. 2–4 However, in this case the laser generators are powered by a storage battery 24 recharged by a solar panel 28 which additionally acts a a protective cover. The laser radiation station also includes an antenna 26 mounted at the top of the station which receive, incoming signals that activate the laser radiation station through the use of a radio activator 22.

Figure 6:
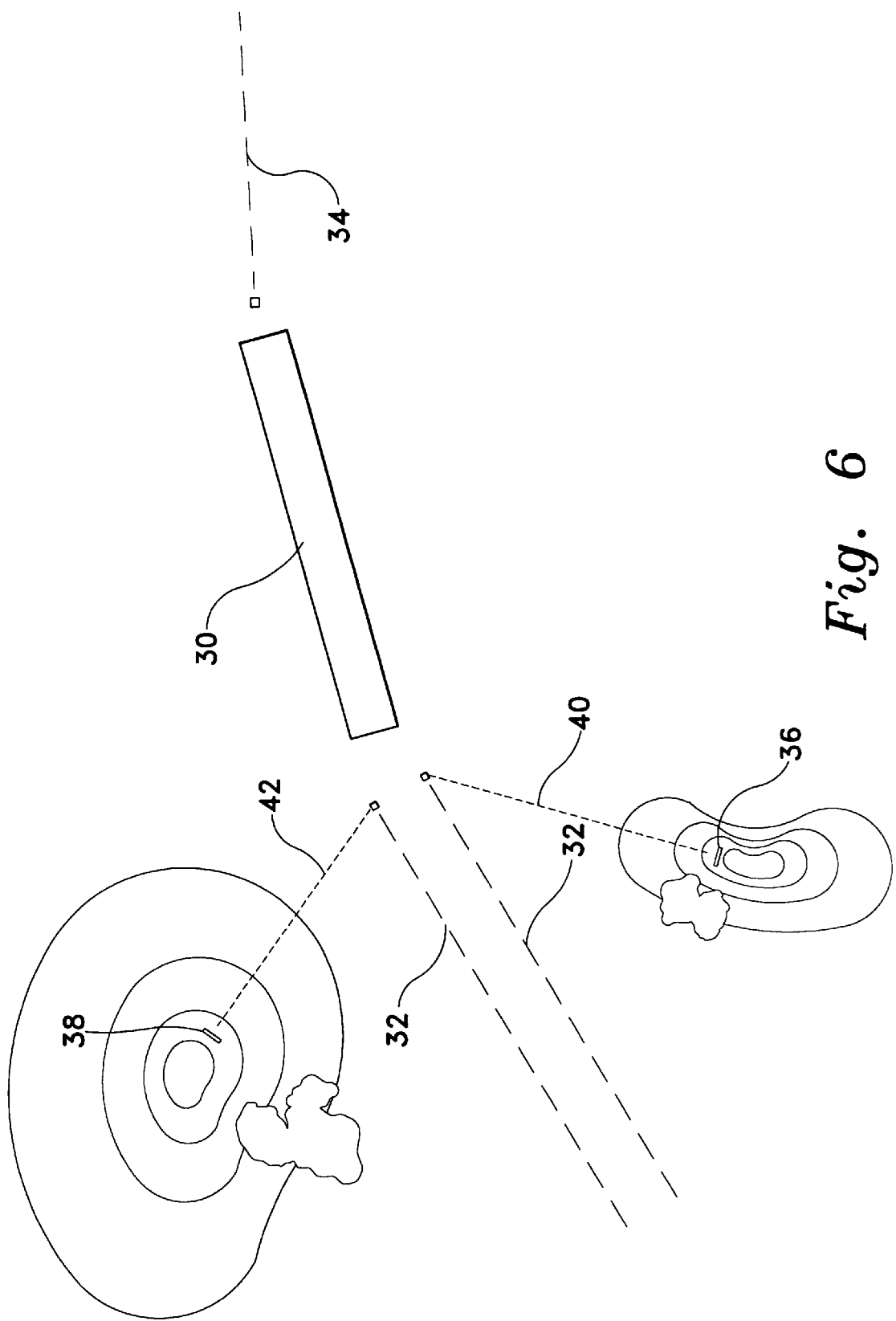
FIG. 6 is a top view of a second runway equipped with a laser lighting system according to the invention.

FIG. 6 illustrates a second runway 30 equipped with visible and reflective laser radiation stations. Visible approach laser beams 32 are transmitted to give incoming pilots an indication of the preferable approach path to the runway 30. A visible departure laser beam 34 is also transmitted to give outgoing pilots an indication of the preferable departure path from runway 30. In addition to the visible laser beams 32 and 34, FIG. 6 additionally includes reflective laser beams 40 and 42 which respective reflect off of reflectors 36 and 38 which are mounted on hilly obstacles which should be avoided.

Figure 7:
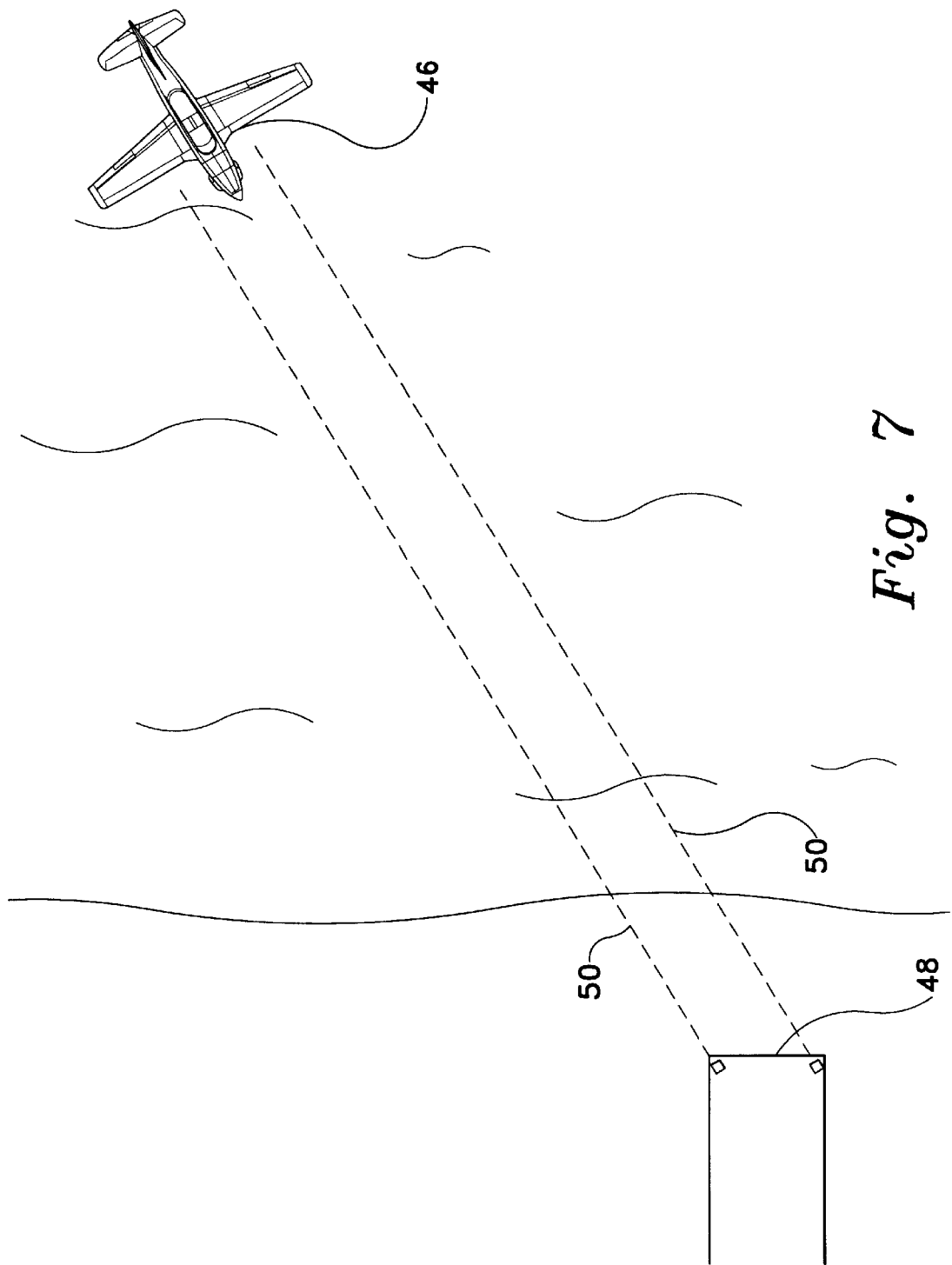
FIG. 7 is a top view of a marine waterway equipped with a laser lighting system according the invention.

An application for a seaplane or skiplane base on a first marine waterway is shown in FIG. 7. The laser beams may terminate on the opposite shore or end in infinity. An aircraft 46 is flying toward a dock 48 which includes laser generators mounted thereon that transmit visible laser beams 50 to indicate a preferred approach path to the dock 48. The visible laser beams 50 are transmitted a suitable location, such as about one foot above the water or ice of the waterway, on a horizontal plane.

Figure 8:
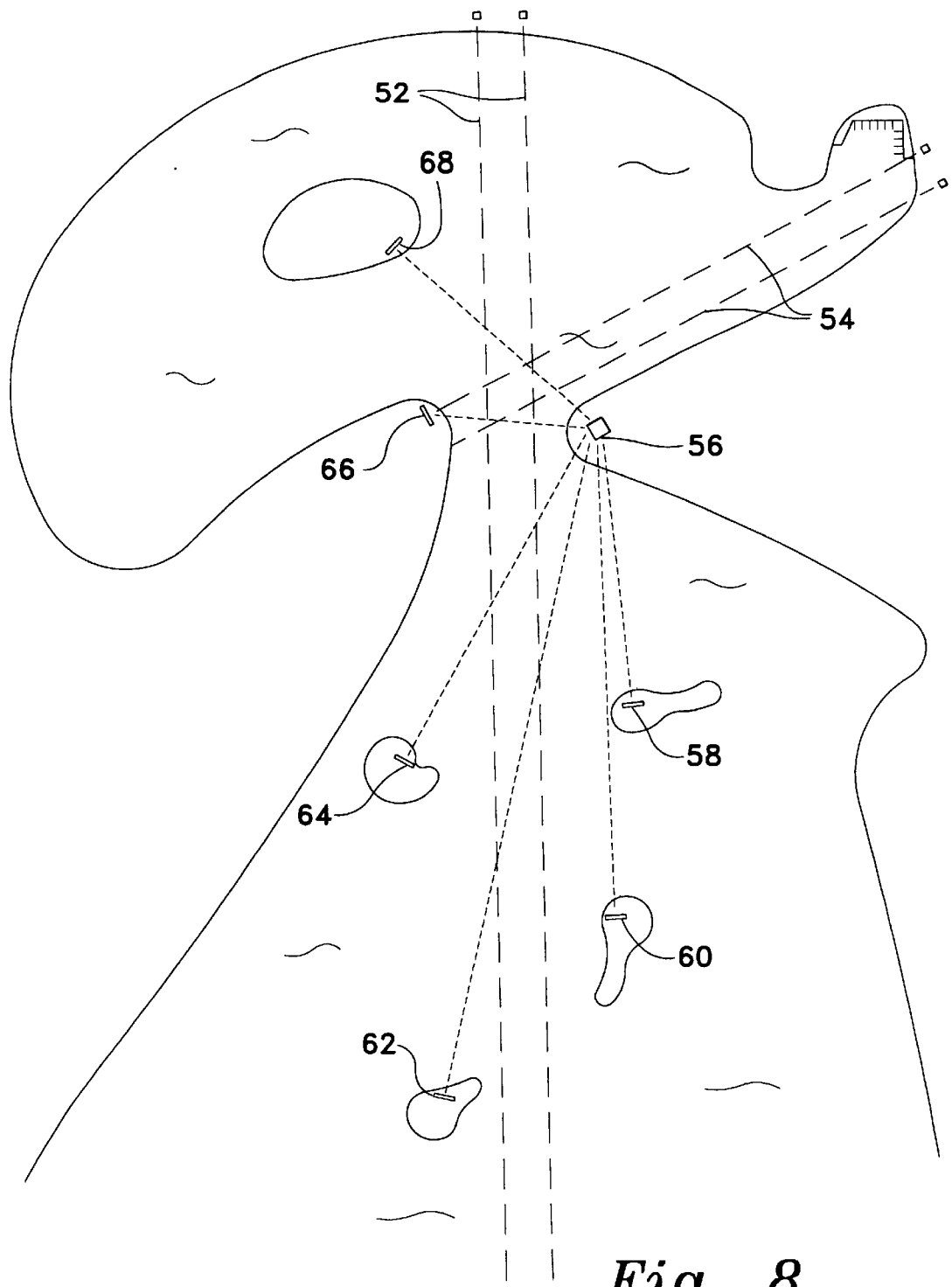
FIG. 8 is a top view of another marine waterway equipped with a a laser lighting system according the invention.

A second marine waterway is illustrated in FIG. 8. Two sets of visible laser beams 52 and 54 are transmitted a small distance over the waterway to indicate preferable docking approach paths to landing docks. Visible laser beams are placed on floating structures to indicate safe passage to and from harbors, moorages, and channels. In addition, the marine waterway includes the use of a reflective laser radiation station 56. The reflective laser radiation station transmits reflective laser beams that target reflective devices 58, 60, 62, 64, 66, and 68 that are placed on or around permanent or temporary obstacles, hazards and markers.

Figure 9:
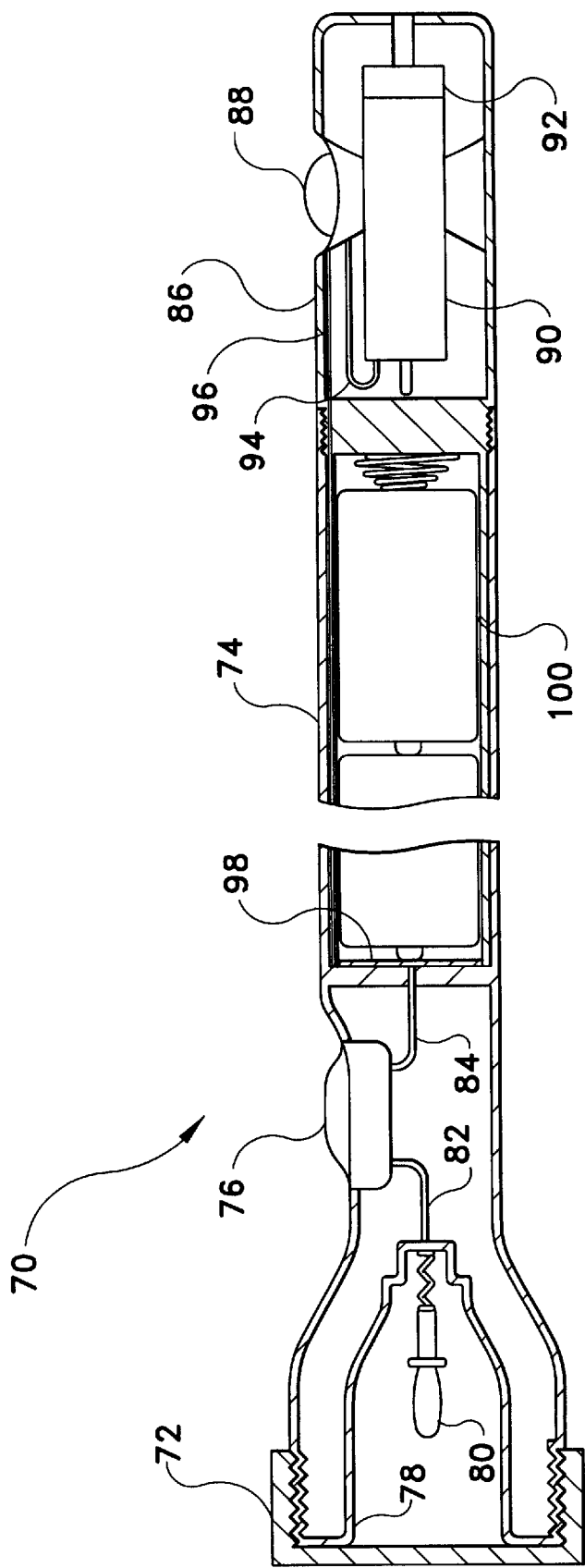
FIG. 9 is a side view of a handheld laser lighting unit according to the invention that includes a flashlight.

FIG. 9 shows a laser lighting unit 70 in the form of a handheld flashlight for use in search and rescue operations. When people are stranded in the water due to an accident or other misfortune, oftentimes search and rescue personnel are sent into the area to locate the missing individuals. The laser lighting unit 70 enhances the ability of search and rescue personnel to locate missing individuals. The laser lighting unit 70 includes a case 74 containing a flashlight light bulb 80 and switch means 76 for selectively energizing the light bulb 80 from batteries 100 to illuminate the light bulb 80 via wiring 82 and 84. The case 74 is cylindrical in shape and receives the front end of a case 86 which is screwed into the end of case 74. The front end of case 86 contains a battery compartment for receiving a plurality of batteries 100, typically D size batteries, in series relation to form a power source. The front portion of the case 74 is enlarged to form a head having a front opening or aperture spanned by a parent lens 72. Within the head behind the light bulb 80 is a generally parabolic reflector 78. The light bulb 80 is situated approximately at the focus of the reflector 78 and is removably mounted within a cup holder at the rear of the reflector 78. Within the holder behind the light bulb 80 is a compression spring. This spring seats at its front end against a base end contact of the light bulb 80 and at its rear end against a contact at the rear end of the holder.

The rear end of case 86 contains a laser 90 including a lens 92 for directing the generated laser light. The lens 92 is a line generating optic comprising a glass plano-convex cylindrical lens having an aspherical cylindrical convex surface which is critical for generating a laser line which is uniformally illuminated from end to end. Conventional cylindrical lens employ a spherical cylindrical convex surface which, when employed with lasers, results in a Gaussian line, i.e. brighter in the center and dim at the outer ends. When this spherical cylindrical convex surface is altered, or aspherized, to the proper parameters, the resultant projected laser line becomes uniformally illuminated from end to end. The laser 90 is powered by means of switch means 88 which selectively energizes the laser 90 via wiring 94 which provides power from switch means 88 delivered through wiring 96 which interconnects a metal lid 98 of case 86 within which the batteries 100 are placed. The projected laser line is emitted through the rear end of case 86 through a small opening.

Figure 10:
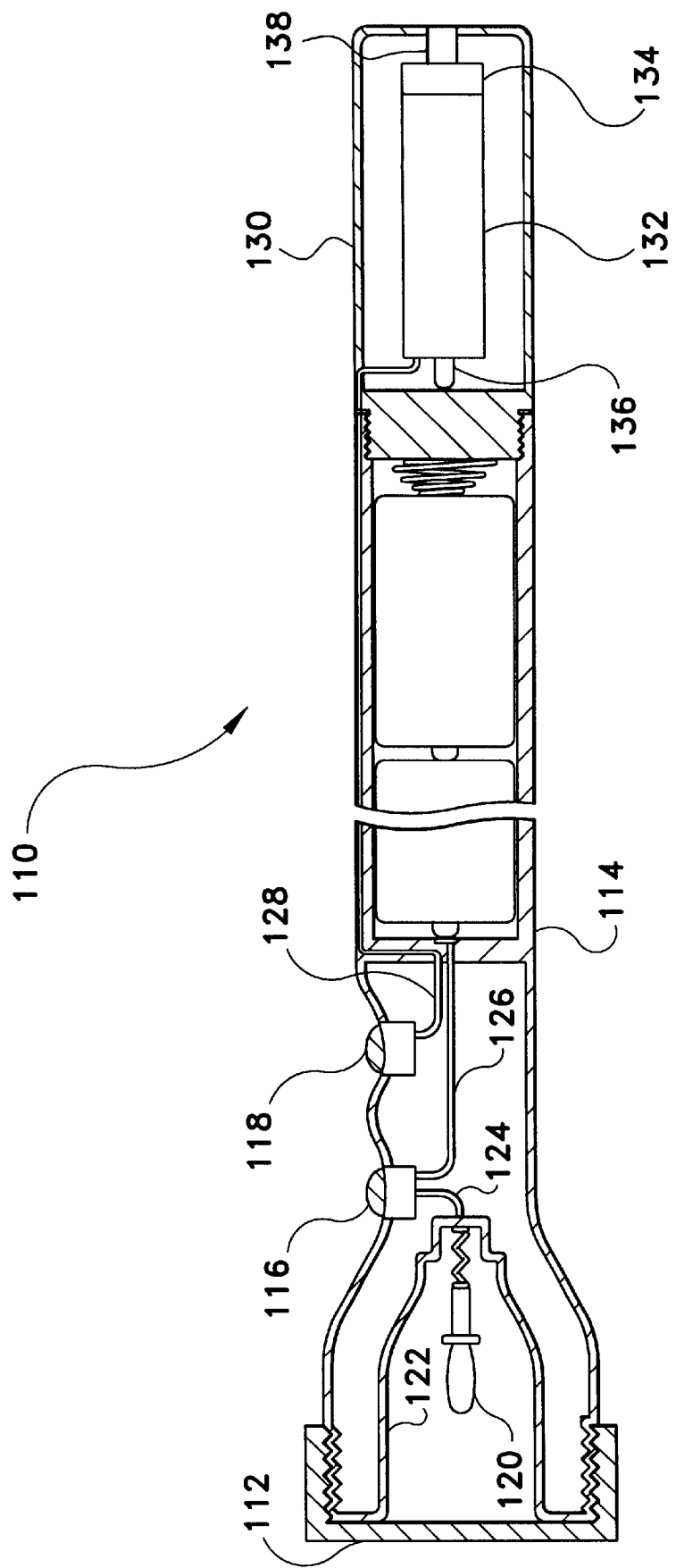
FIG. 10 is a side view of a handheld laser lighting unit according to the invention that includes a flashlight.

FIG. 10 shows a laser lighting unit 110 which is similar to the laser lighting unit 70 shown in FIG. 9. The laser lighting unit 110 includes a case 114 containing a flashlight light bulb 120 and switch means 116 for selectively energizing the light bulb 120 from batteries to illuminate the light bulb 120 via wiring 124 and 126. The case 114 is cylindrical in shape and receives the front end of a case 130 which is screwed into the end of case 114. However, case 114 also includes switch means 118 for a laser 132 the forward end of case 114. Furthermore, case 114 is contains a battery compartment for receiving a plurality of batteries, typically D size batteries, in series relation to form a power source.

The front portion of case 114 is enlarged to form a head having a front opening or aperture spanned by a parent lens 112. Within the head behind the light bulb 120 is a generally parabolic reflector 122. The light bulb 120 is situated approximately at the focus of the reflector 122 and is removably mounted within a cup holder at the rear of the reflector 122. Within the holder behind the light bulb 120 is a compression spring. This spring seats at its front end against a base end contact of the light bulb 120 and at its rear end against a contact at the rear end of the holder.

Case 130 contains a laser 132 including a lens 134 for directing the generated laser light. The lens 134 is a line generating optic comprising a glass plano-convex cylindrical lens having an aspherical cylindrical convex surface which is critical for generating a laser line which is uniformally illuminated from end to end. The laser 132 is powered by means of switch means, 118 which selectively energizes the laser 132 via wiring 128 which provides power from switch means 118 delivered by the batteries. The projected laser line is emitted through the rear end of case 130 through a small opening 138.

Figure 11:
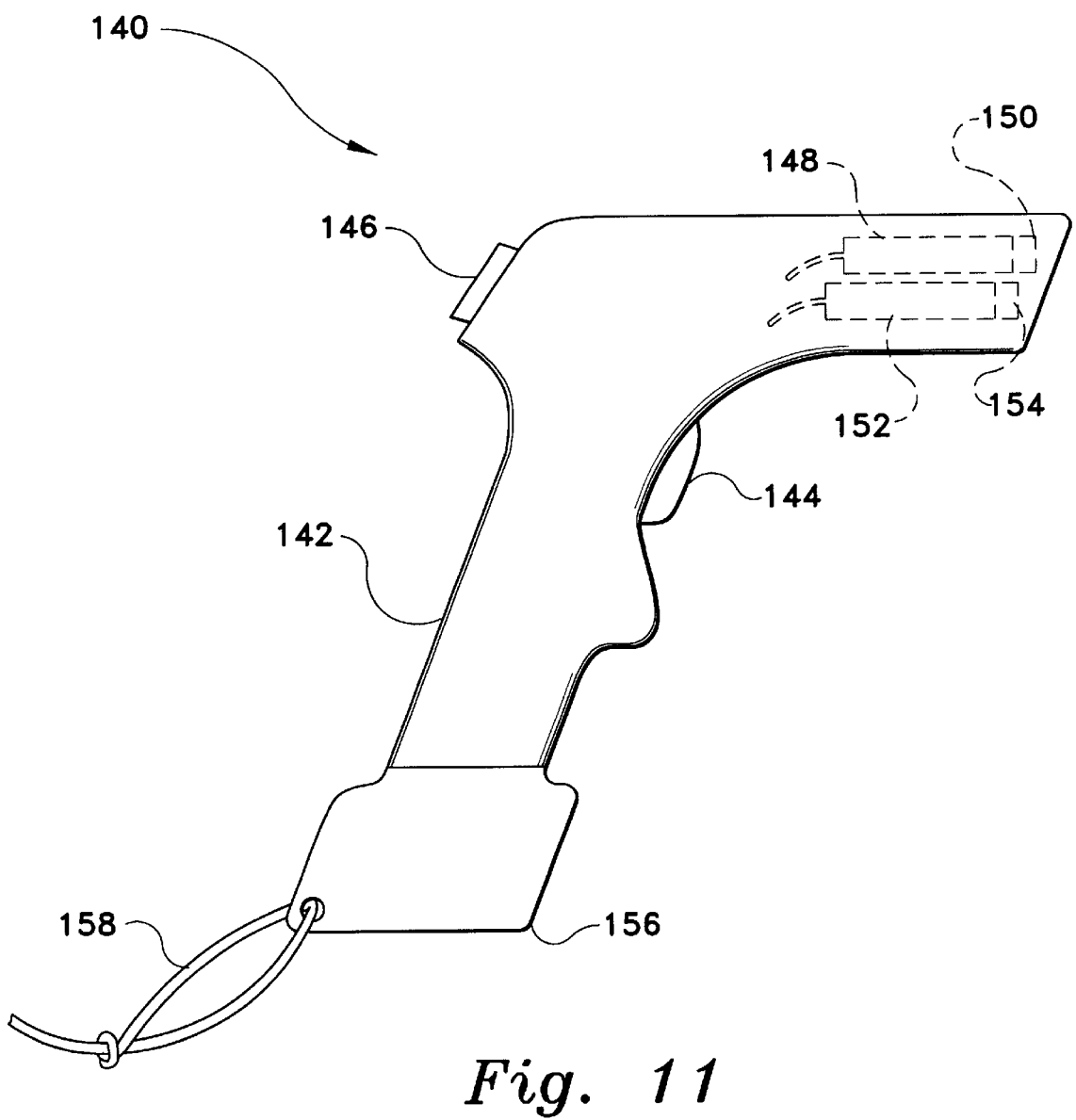
FIG. 11 is a side view of a handheld laser lighting unit according to the invention that includes two lasers in a case powered by a removable rechargeable battery pack.

FIG. 11 shows a handheld laser lighting unit 140 for use in search and rescue operations. The laser lighting unit 140 includes a case 142 containing a green laser 148 and a red laser 152 that each include a line generating optic lens 150 and 154 for directing the generated laser light. The lenses 150 and 154 each comprise a glass plano-convex cylindrical lens having an aspherical cylindrical convex surface which is critical for generating a laser line which is uniformally illuminated from end to end. The laser lighting unit 140 also includes an interchangeable rechargeable battery pack 156. The lasers 148 and 152 are selectively chosen switch means 146 and are powered by switch means 144 which selectively energizes the lasers 148 and 152 via wiring (not shown) which provides power from switch means 144 delivered from the battery pack 156. The projected laser line is emitted through the front end of case 142. To accommodate shipboard use, the battery pack 156 may include a safety lanyard 158 to facilitate securing the laser lighting unit to a ship.

Figure 12:
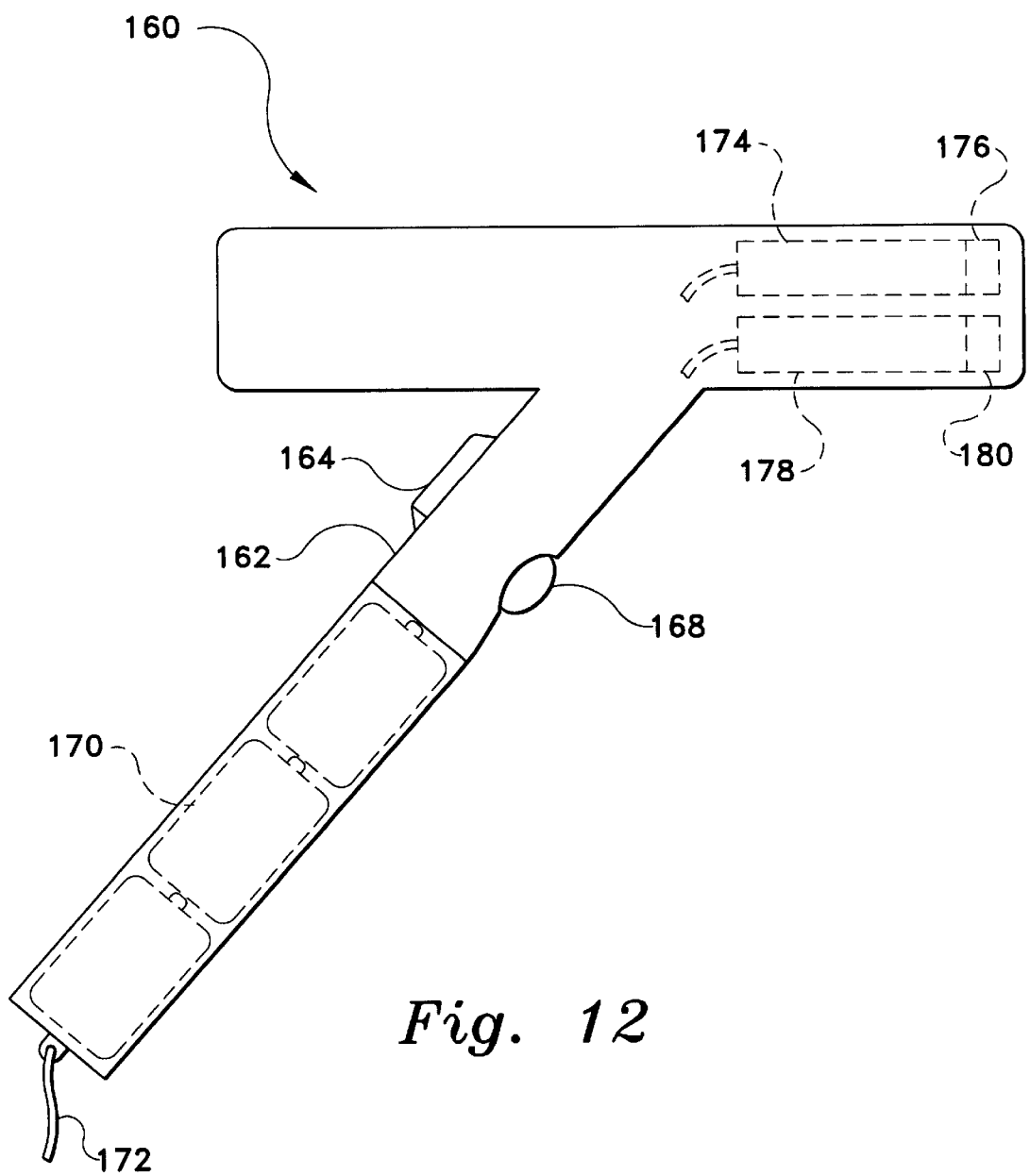
FIG. 12 is a side view of a handheld laser lighting unit according to the invention that includes two lasers in a case with three batteries.

FIG. 12 shows a handheld laser lighting unit 160 for use in search and rescue operations. The laser lighting unit 160 includes a case 162 containing a green laser 174 and a red laser 178 that each include a line generating optic lens 176 and 180 for directing the generated laser light. The lenses 176 and 180 each comprise a glass plano-convex cylindrical lens having an aspherical cylindrical convex surface which is critical for generating a laser line which is uniformally illuminated from end to end. The case 162 also receives a plurality of batteries in series relation to form a power source. The lasers 174 and 178 are selectively chosen by switch means 164 and are powered by switch means 168 which selectively energizes the lasers 174 and 178 via wiring (not shown) which provides power from switch means 144 delivered from the batteries 170. The projected laser line is emitted through the front end of case 162. To accommodate shipboard use, the case 162 may include according means 172 to facilitate securing the laser lighting unit to a ship.

Figure 13:
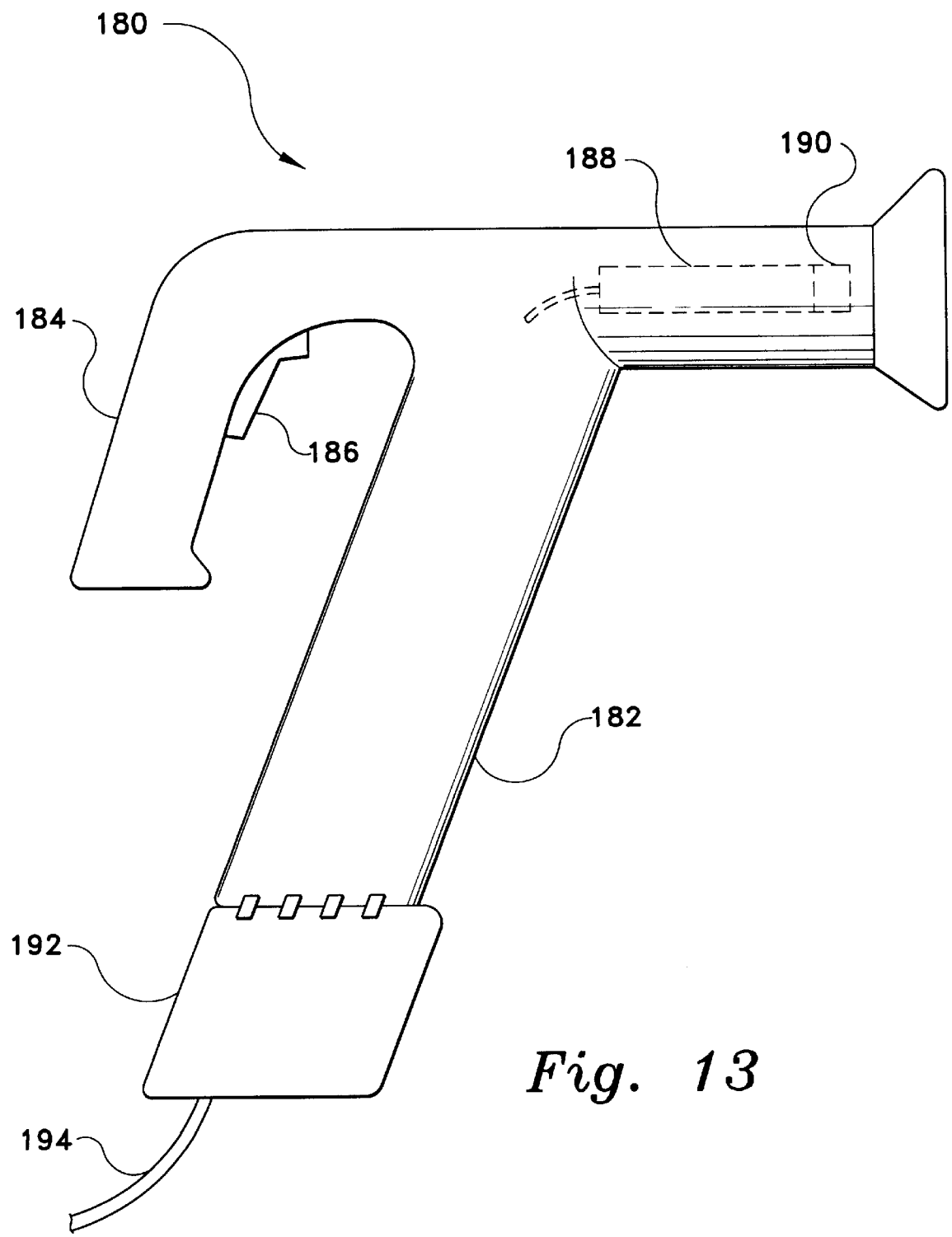
FIG. 13 is a side view of a miniaturized handheld laser lighting unit according to the invention that includes one laser in a case powered by either a removable rechargeable battery pack or shipboard power.

FIG. 13 shows a handheld laser lighting unit 180 for use in search and rescue operations. The laser lighting unit 180 includes a case 182 containing one laser 188 which includes a line generating optic lens 190 for directing the generated laser light. The lens 190 comprise a glass plano-convex cylindrical lens having an aspherical cylindrical convex surface which is critical for generating a laser line which is uniformally illuminated from end to end. The case 182 also includes an interchangeable rechargeable battery pack 192 to form a power source or, alternatively, the pack 192 may provide shipboard power via wiring means 194. The laser 188 is powered by switch means 186 which selectively energizes the laser 188 via wiring (not shown) which provides power from switch means 186 delivered from the power pack 192. The projected laser line is emitted through the front end of case 182.

Figure 14:
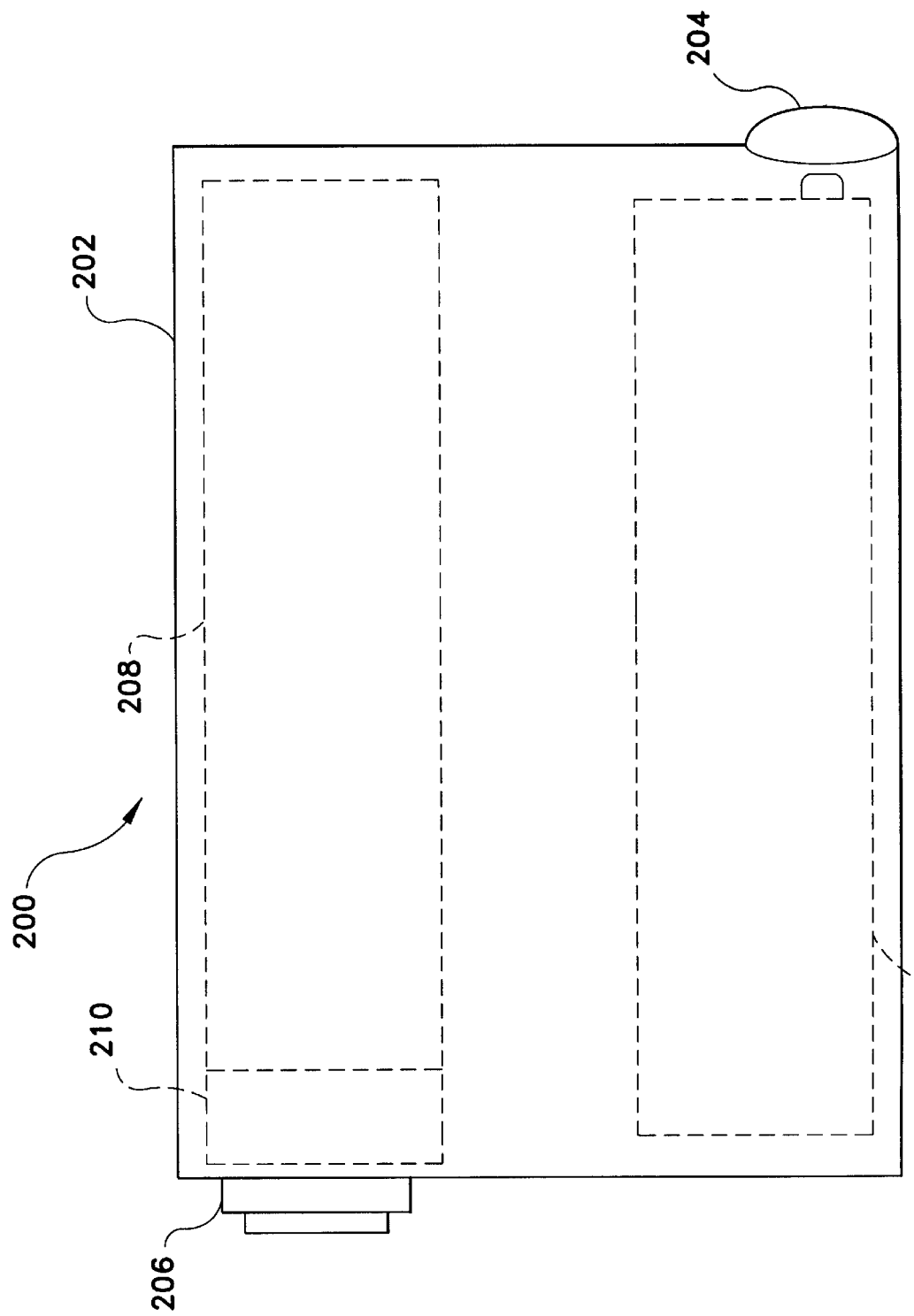
FIG. 14 is a side view of a handheld laser lighting unit according to the invention that includes one laser in a case powered by a battery.

FIG. 14 shows a miniaturized handheld laser lighting unit 200 for use in search and rescue operations. The laser lighting unit 200 includes a case 202 containing one laser 208 which includes a line generating optic lens 210 for directing the generated laser light. The lens 210 comprises a glass plano-convex cylindrical lens having an aspherical cylindrical convex surface which is critical for generating a laser line which is uniformally illuminated from end to end. The case 202 also contains a battery 212 which forms a power source. The laser 208 is powered by switch means 204 which selectively energizes the laser 208 via wiring (not shown) which provides power from switch means 204 delivered from the battery 212. The projected laser line is emitted through the front end 206 of case 202.

Figure 15:
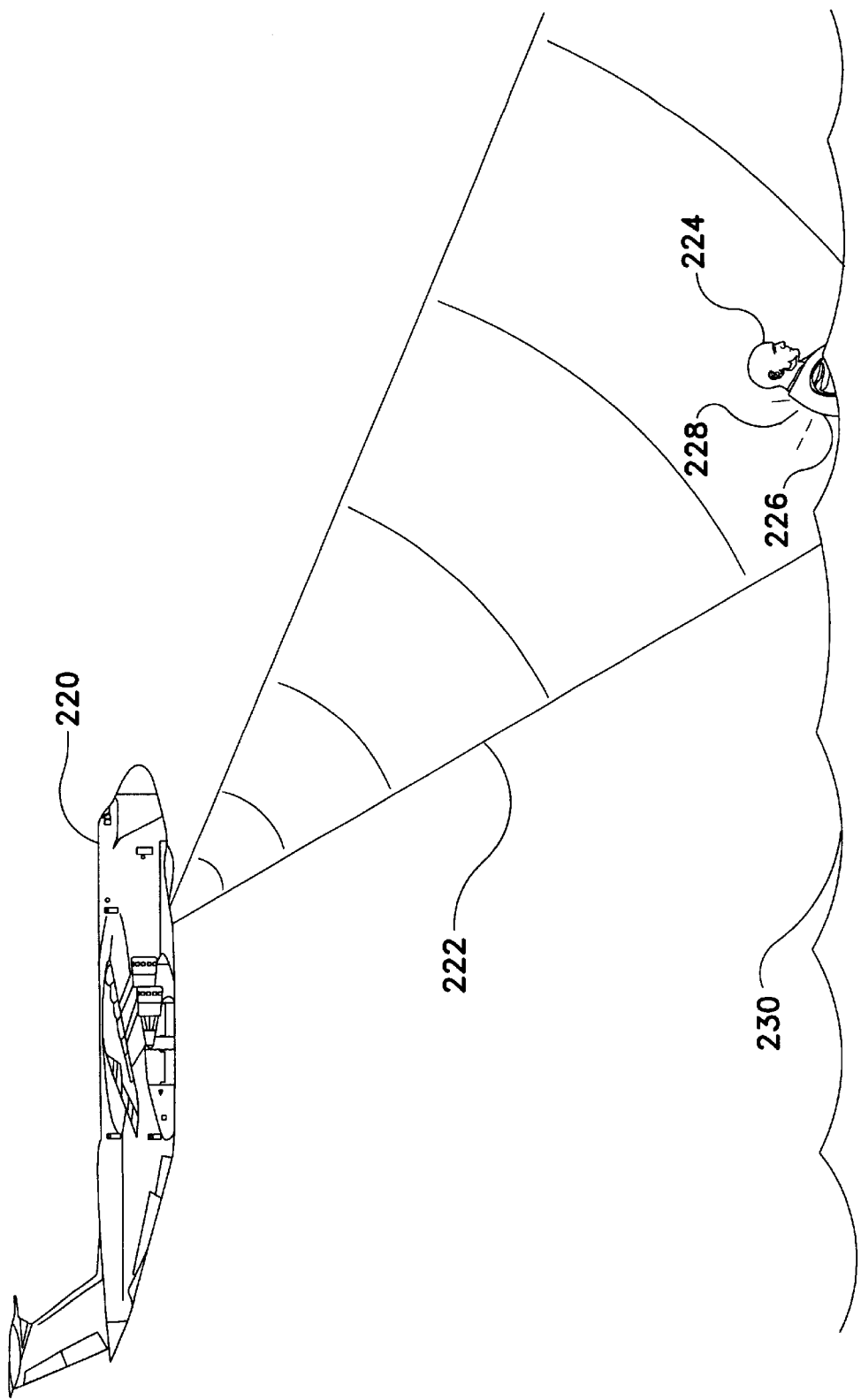
FIG. 15 is a side view of a search and rescue aircraft with a laser according to the invention locating an individual in the sea.

FIG. 15 shows an aircraft 220 using a laser lighting unit for projecting a laser beam 222 to assist in locating a missing person 224 at sea 230. In this case the missing person 224 is wearing a life vest 226 with a covering that reflects laser light 228 to enable observers in the aircraft 220 to readily identify the location of the individual. Obviously, the laser lighting unit may also be employed by a ship in the sea 230.

Figure 16:
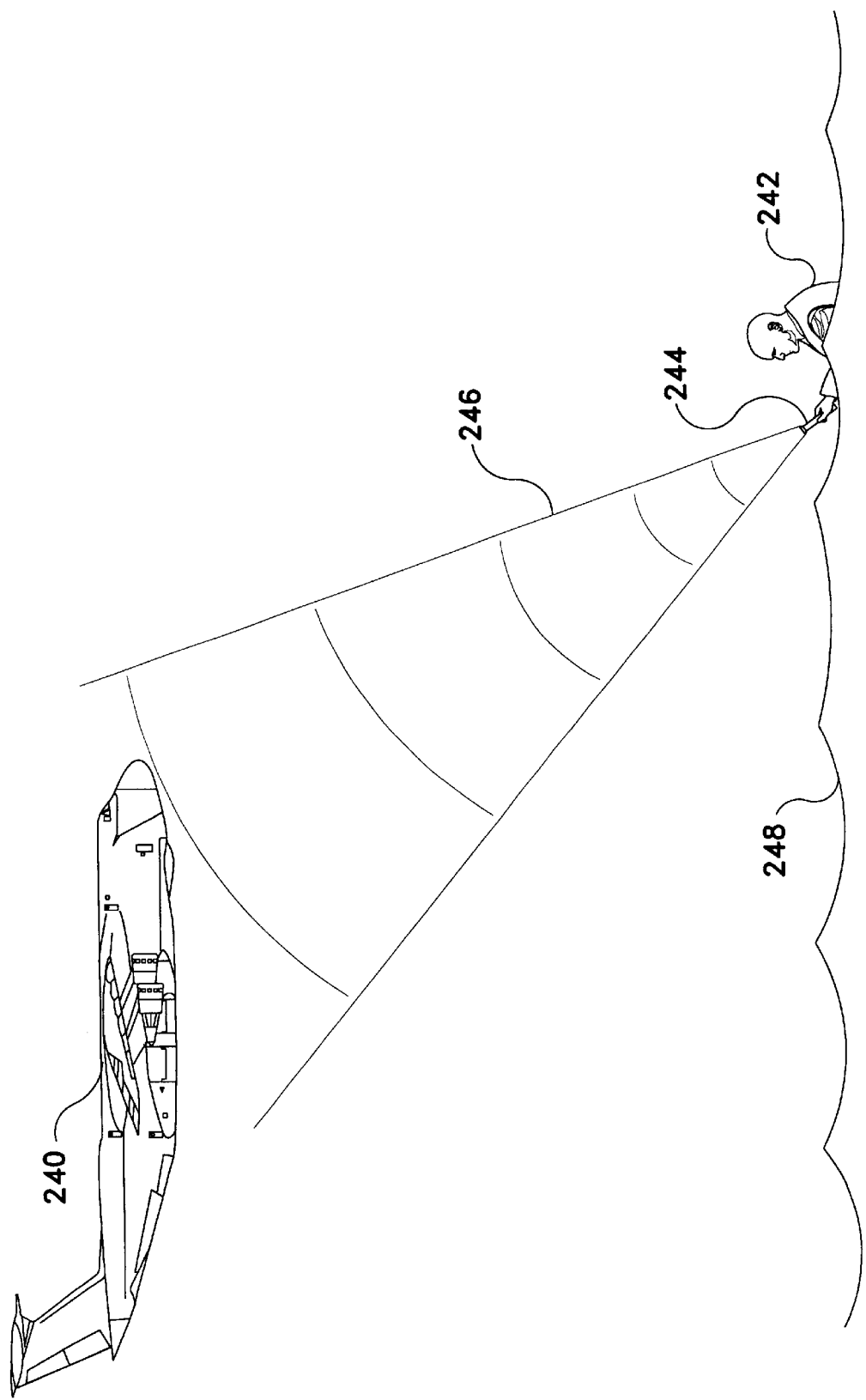
FIG. 16 is a side view of an individual using a laser lighting unit according to the invention to alert an overflying aircraft.

FIG. 16 shows a missing person 242 in the sea 248 using a laser lighting unit 244 for projecting a laser beam 246 to assist the individual 242 in being identified by an overflying aircraft 240. In this case the missing person 224 projects the laser beam 246 which will enable observers in the aircraft 220 to readily identify the location of the individual 242. Obviously the laser lighting unit 244 may also be employed to assist the individual 242 in being identified by a ship in the sea 248.

Figure 17:
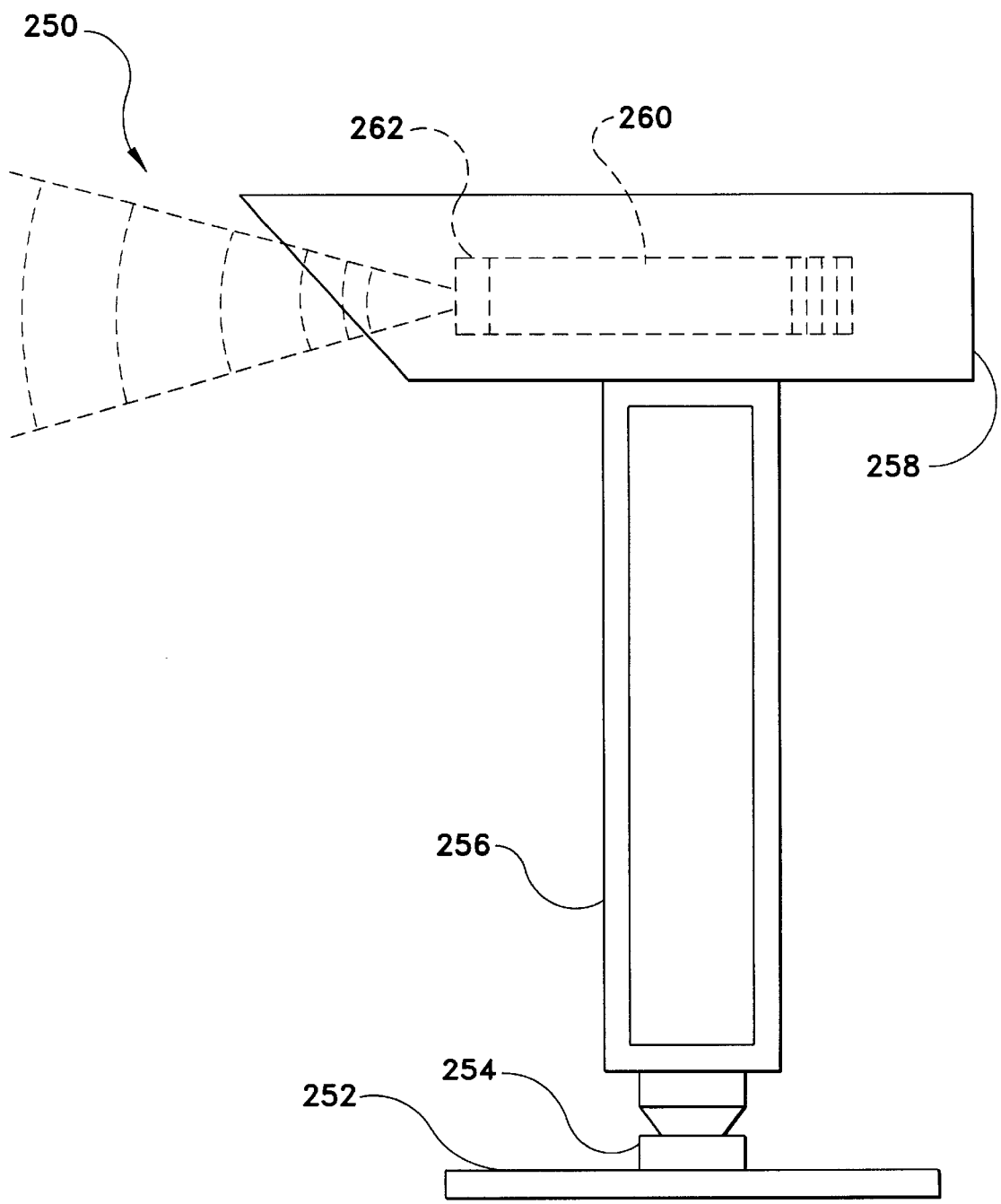
FIG. 17 is a side view of a laser lighting post according the invention.

FIG. 17 shows another laser lighting post 250 according to the invention for providing radiation along a surface. The laser lighting post 250 includes one laser 260 for producing a beam of coherent visible or reflective radiation and a glass plano-convex cylindrical lens 262 which has an aspherical convex cylindrical surface for generating a laser line which is uniformally illuminated from end to end. The laser lighting post 250 also includes a mounting column 256 which has an access door for providing access to a tilt switch assembly and an AC/DC power adapter unit. The mounting column 256 is attached to a base plate 252 by a frangible coupling 254.

Figure 18A:
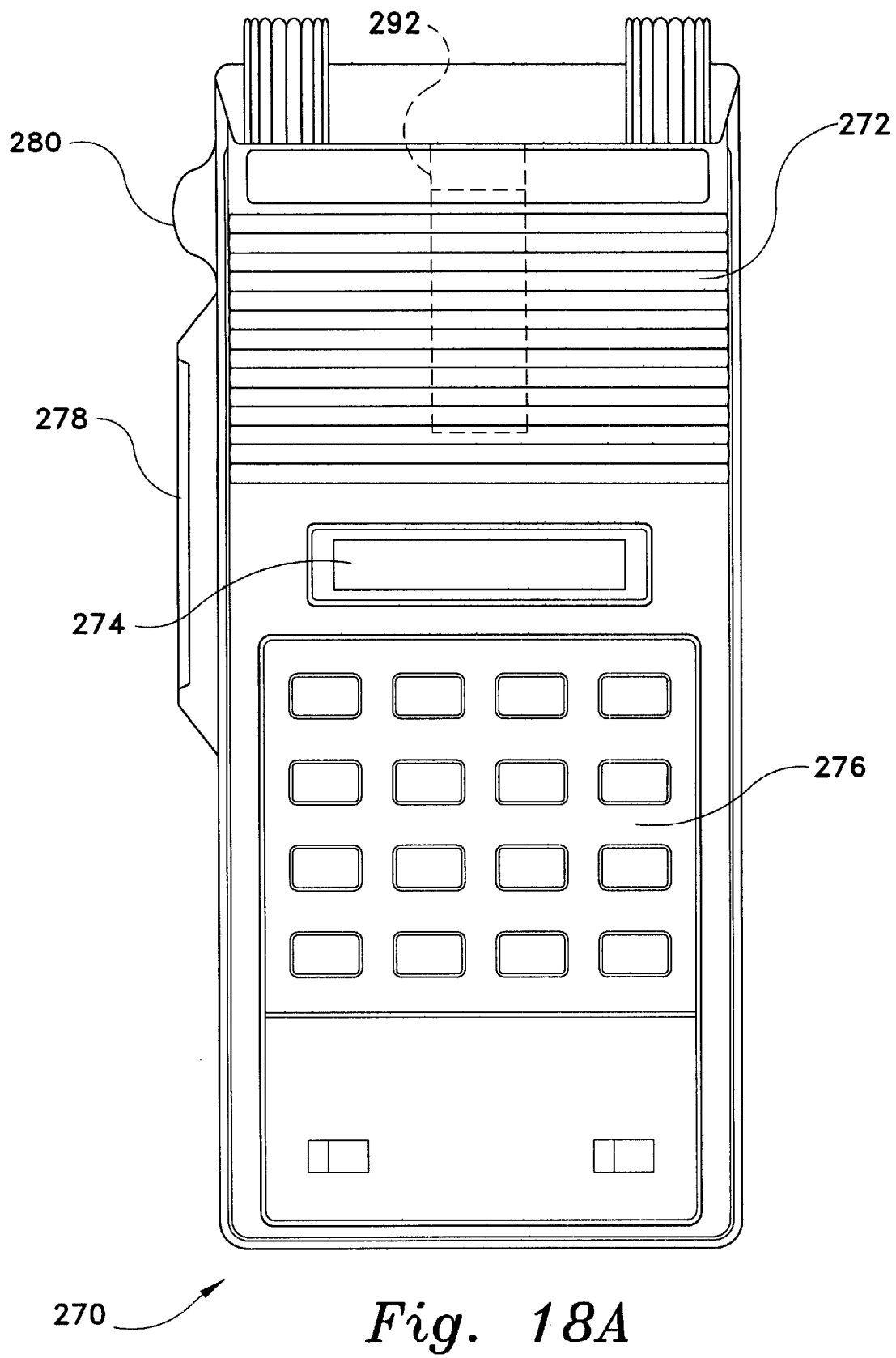
FIG. 18A is a front view of one type of VHF transceiver equipped with a laser lighting unit according to the invention.
Figure 18B:
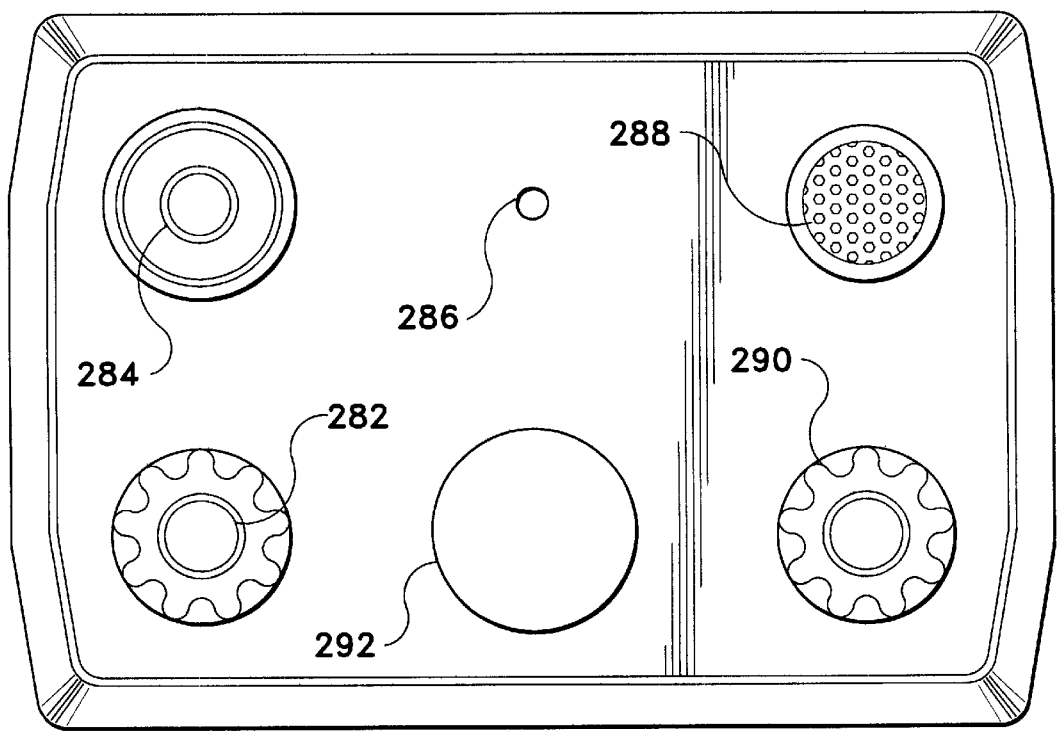
FIG. 18B is a top view of the VHF transceiver shown in FIG. 18A.

Another device useful for search and rescue operations include a handheld radio transceiver equipped with a laser lighting unit One type of radio transceiver is shown in FIGS. 18A and 18B. This radio transceiver 270 includes a casing having mounted therein a speaker/microphone 272, a display 274, a plurality of input keys 276 representing at least the numbers zero through nine and other, a push to talk key 278, a laser 292, and a key 280 to activate or deactivate the laser 292. The top of the casing is shown in FIG. 18B and includes power and volume knob 282, an antenna 284, an indicator light 286, and a laser 292. The transceiver contains.

Elements contained within the transceiver include a transmitter, a receiver, a discriminator, an analog to digital and digital to analog converter, a digital logic controller, and a memory. Radio signals are coupled to and from open space via the antenna 284. Typical transceiver functions include signal detection, modulation, demodulation, amplification, and noise reduction. Carrier frequencies are provided by a frequency synthesizer which is controlled by the digital logic controller. The transceiver is powered by standard or rechargeable batteries.

Figure 19:
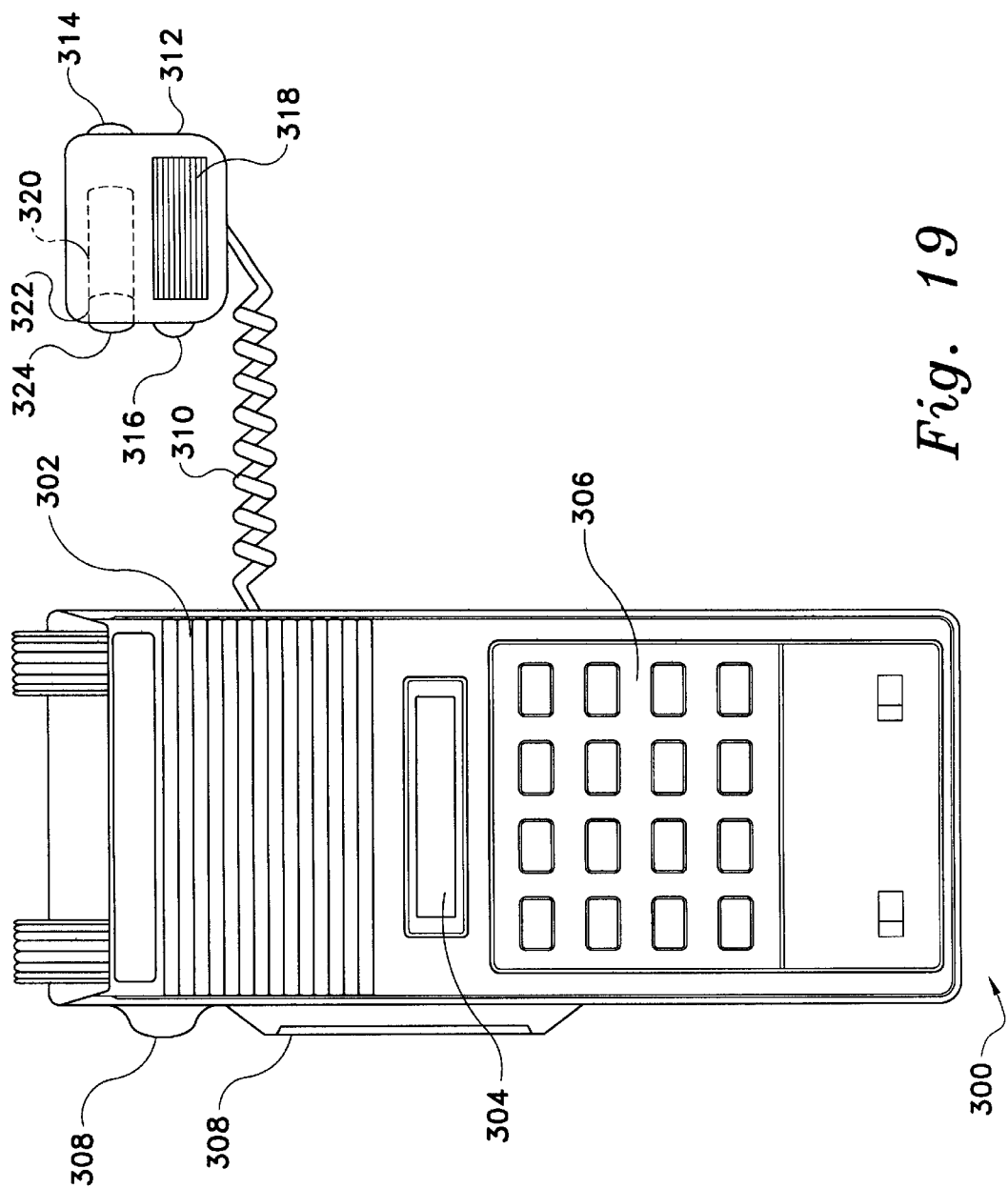
FIG. 19 is a front view of another type of VHF transceiver equipped with a laser lighting unit according to the invention.

Another type of handheld radio transceiver is shown in FIG. 19. This radio transceiver 300 is substantially the same as the transceiver shown in FIGS. 18A and 18B. The transceiver 300 includes a casing having mounted therein a speaker/microphone 30; a display 304, a plurality of input keys 306 representing at least the numbers zero through nine and other, a push to talk key 308 However, this transceiver also includes a handpiece 12 with a laser 324 mounted therein. The handpiece 12 is connected to the transceiver 300 by a cord 310 and includes a speaker/microphone 302, a push to talk key 316, a laser 320, and a key 314 to activate or deactivate the laser 292.

Figure 21:
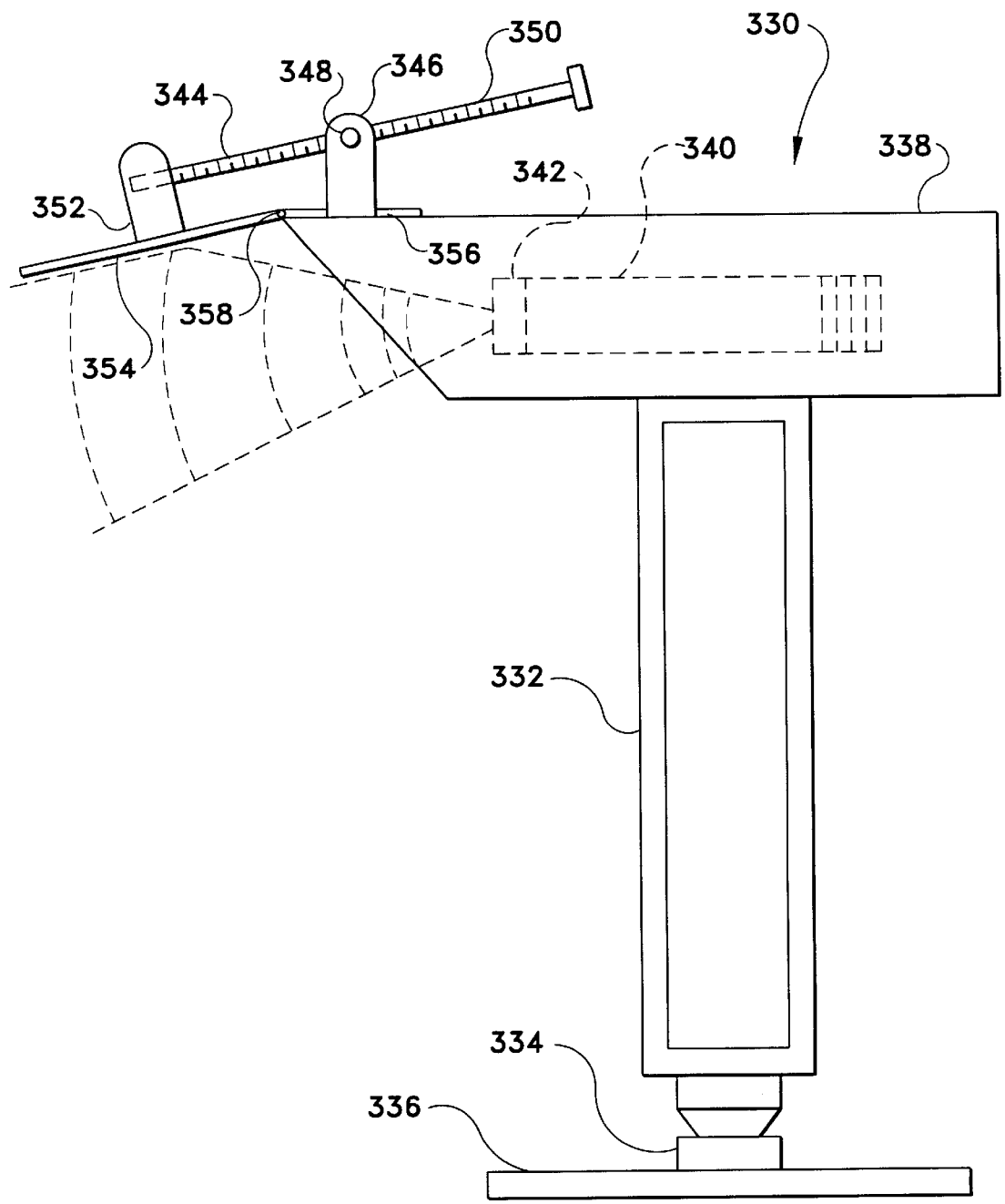
FIG. 21 is a side view of a laser lighting post equipped with one type of adjustable shield according to the invention.

FIG. 21 shows another laser lighting post 330 according to the invention for providing radiation along a surface. The laser lighting post 330 includes one laser 340 for producing a beam of coherent visible or reflective radiation and a glass plano-convex cylindrical lens 342 which has an aspherical convex cylindrical surface for generating a laser line which is uniformally illuminated from end to end. The laser lighting post 330 also includes an adjustable shield 354 which may be manually adjusted up or down about pivot point 358 via rotation of threaded member 350. Threaded member 350 passes between element 346 and element 352. The laser lighting post 330 also includes a mounting column 332 which has an access door for providing access to a tilt switch assembly and an AC/DC power adapter unit. The mounting column 332 is attached to a base plate 336 by a frangible coupling 334.

Figure 22:
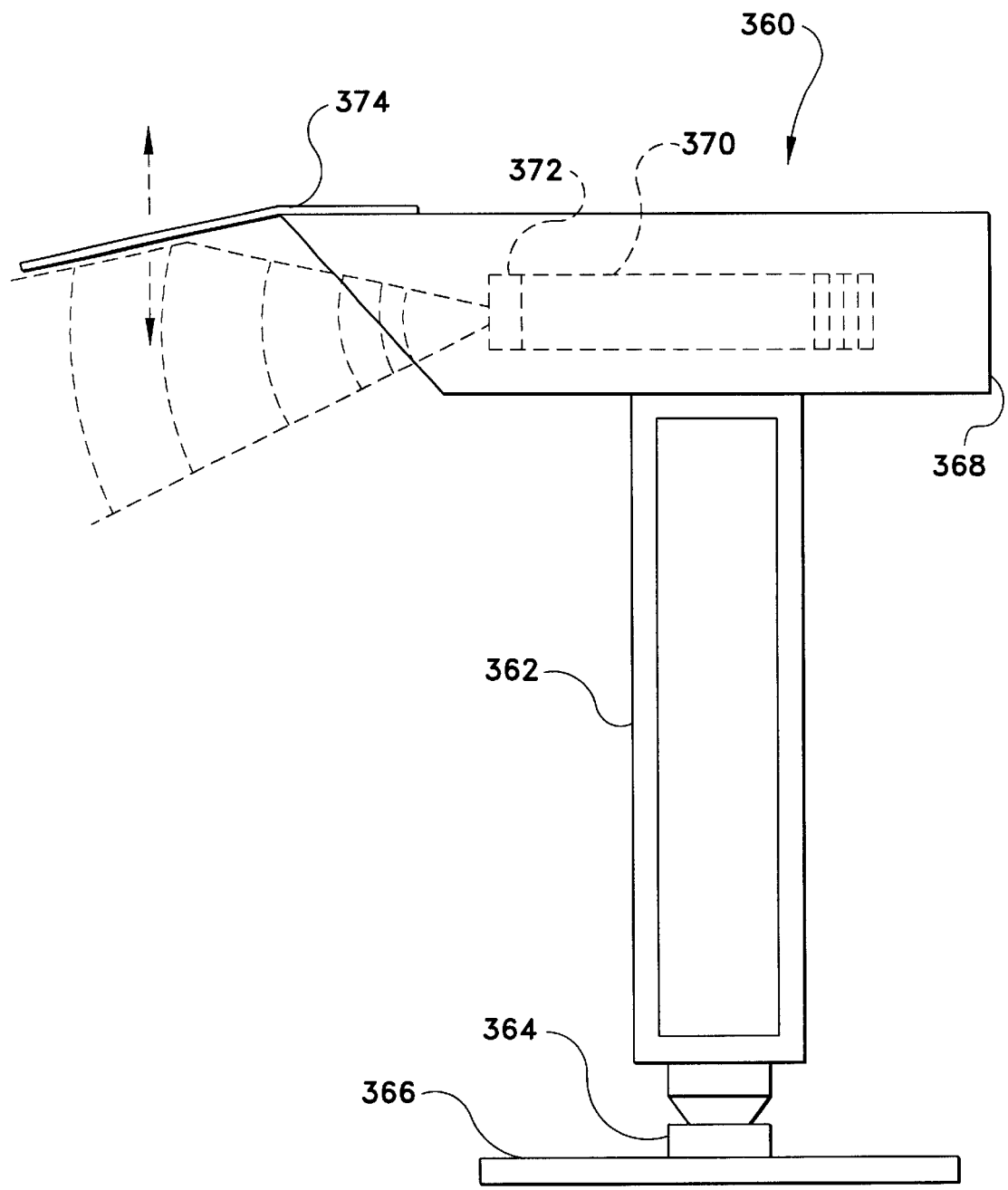
FIG. 22 is a side view of a laser lighting post equipped with another type of adjustable shield according the invention.

FIG. 22 shows another laser lighting post 360 according to the invention for providing radiation along a surface. The laser lighting post 360 includes one laser 370 for producing a beam of coherent visible or reflective radiation and a glass plano-convex cylindrical lens 372 which has an aspherical convex cylindrical surface for generating a laser line which is uniformally illuminated from end to end. The laser lighting post 360 also includes an bendable adjustable shield 374 which may be manually adjusted up or down by applying force to the free end of the shield up or down. The laser lighting post 360 also includes a mounting column 362 which has an access door for providing access to a tilt switch assembly and an AC/DC power adapter unit. The mounting column 362 is attached to a base plate 366 by a frangible coupling 364.

Figure 20:
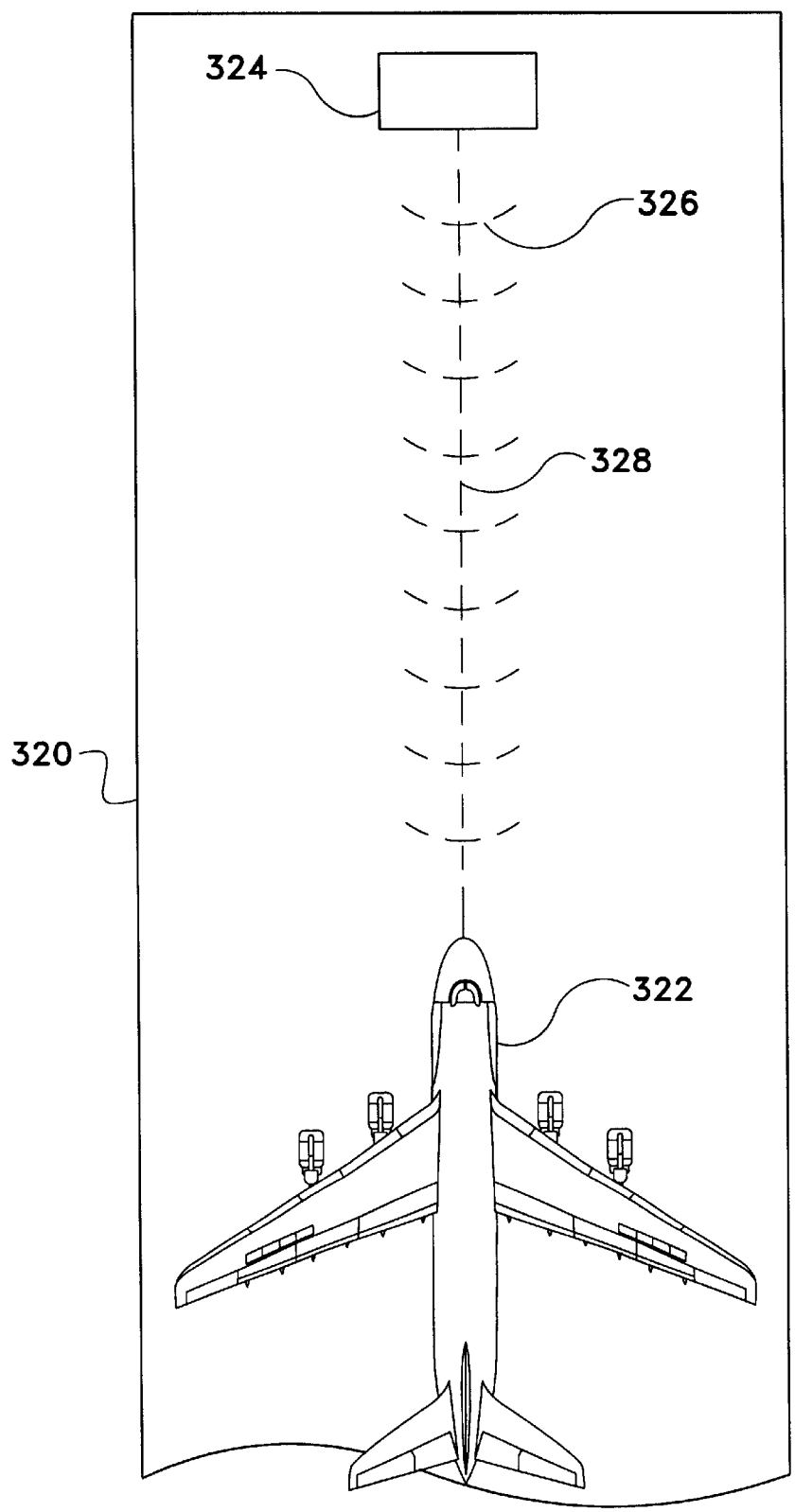
FIG. 20 is a top view of an aircraft on a runway equipped with a doppler radar configured with a laser lighting unit according to the invention.
Figure 23:
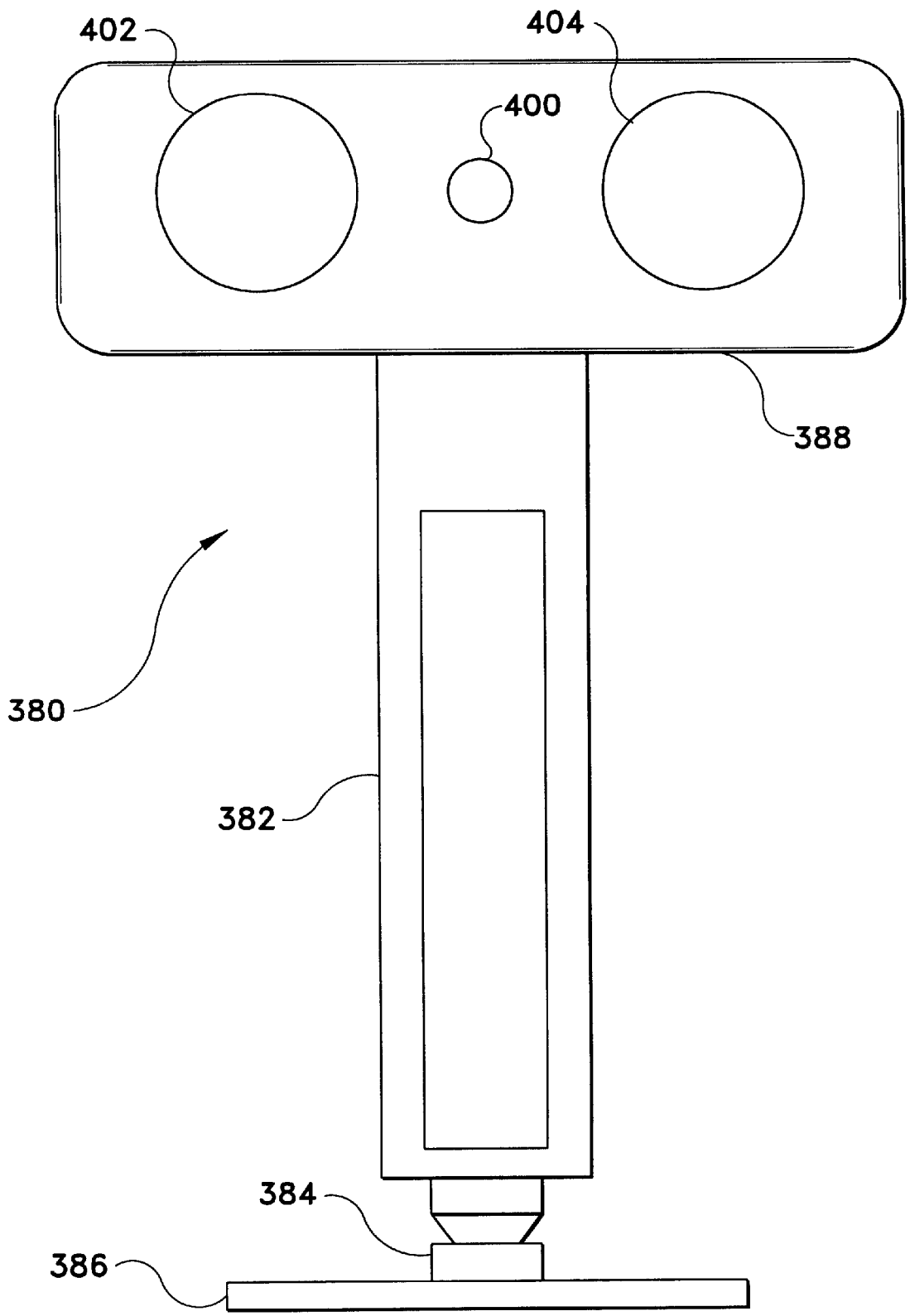
FIG. 23 is a front view of a laser lighting post equipped with a radar device according to the invention.
Figure 24:
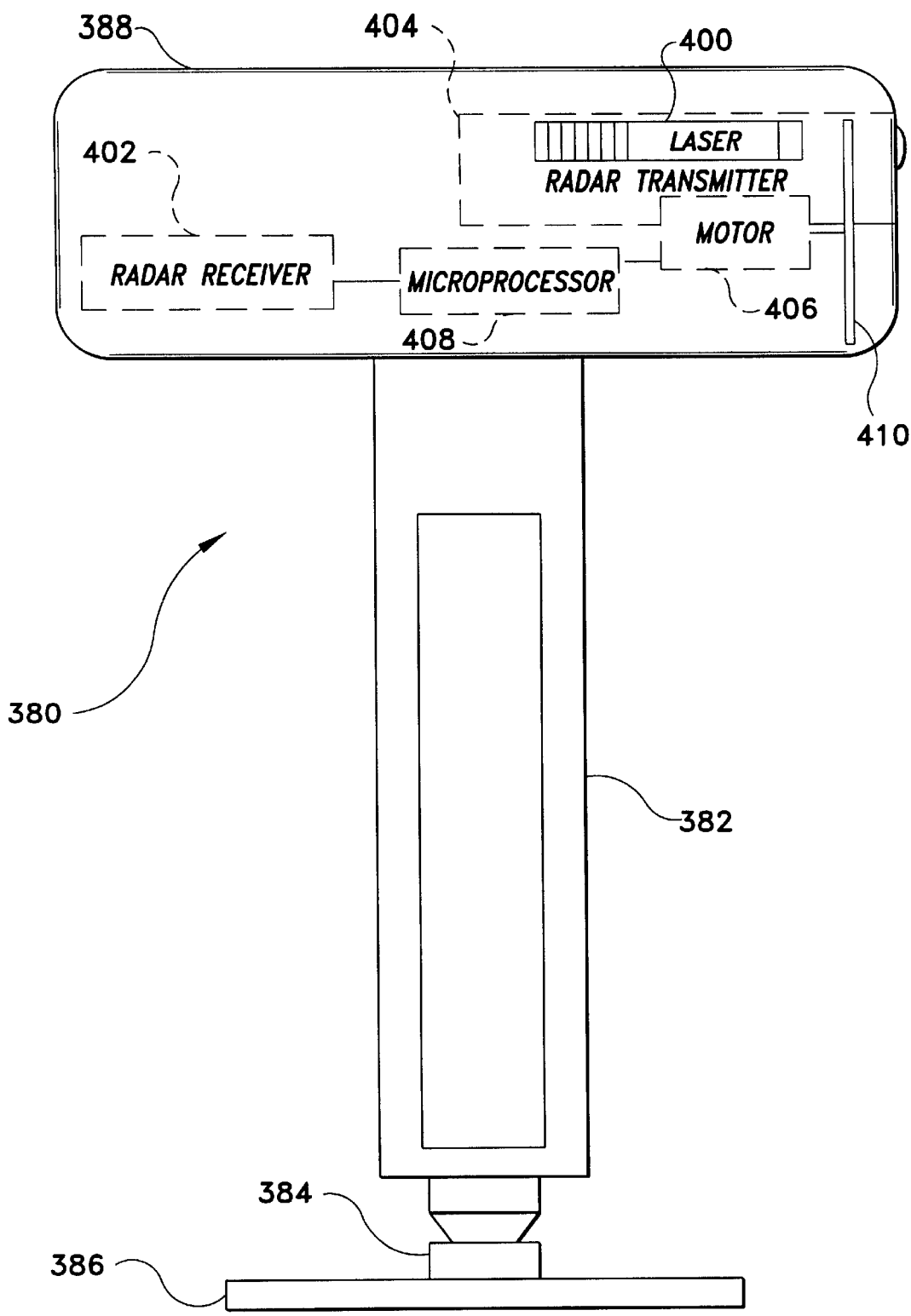
FIG. 24 is a side view of the laser lighting post shown in FIG. 23.
Figure 25:
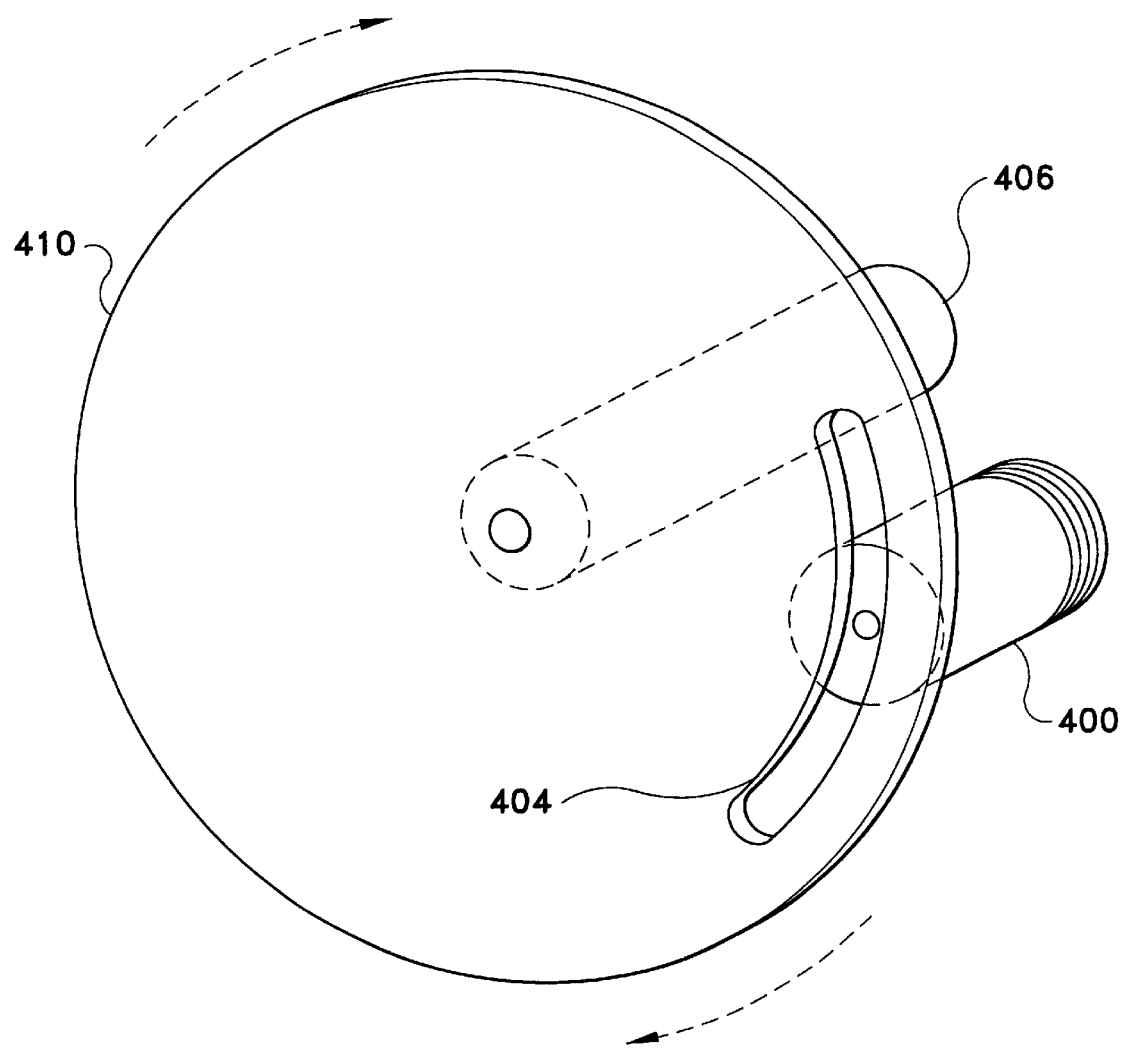
FIG. 25 is perspective view of the perforated disk and laser contained within the laser lighting post shown in FIG. 23.
Figure 26:
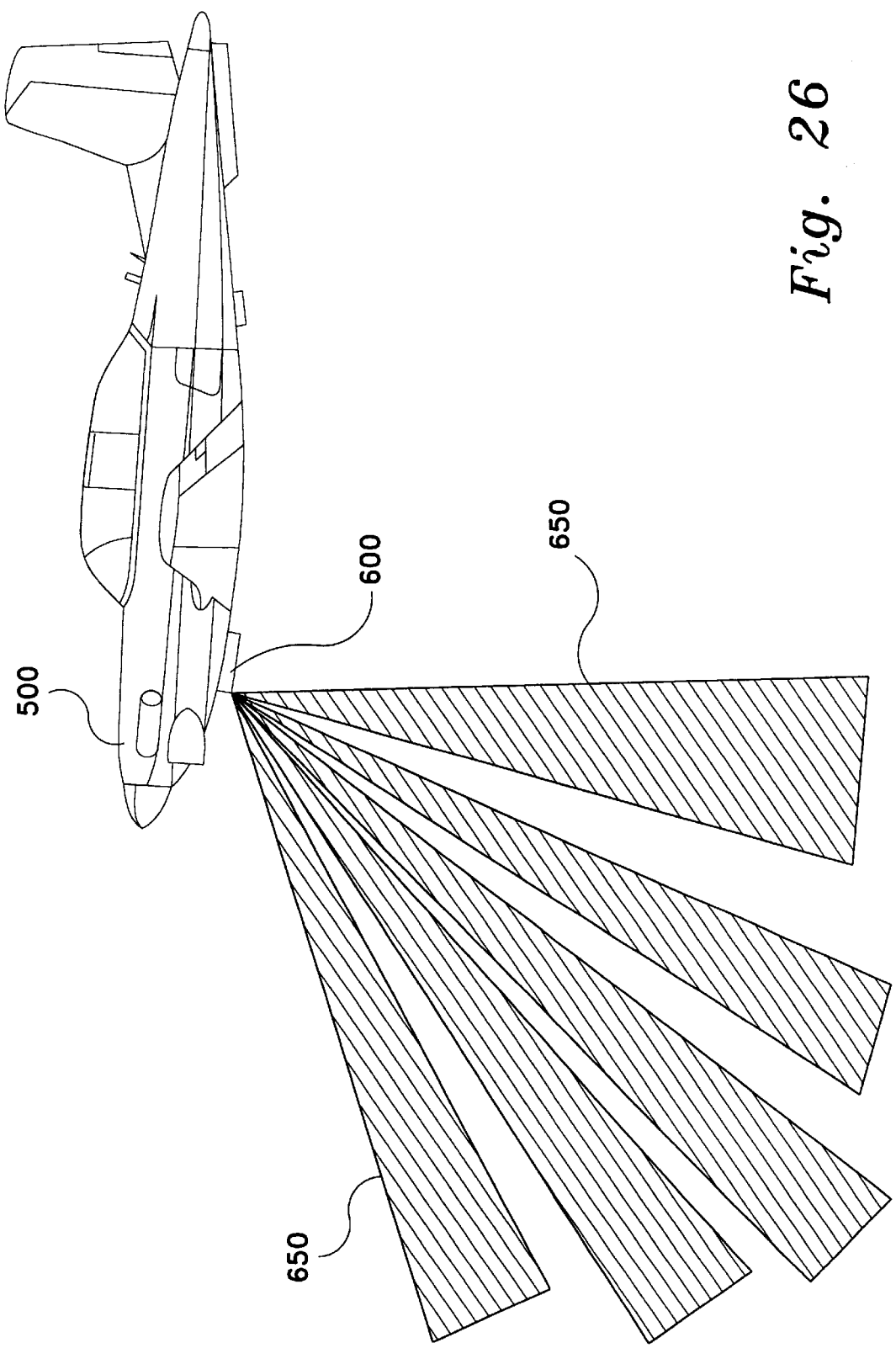
FIG. 26 is a side view of an aircraft equipped with a laser, scanning device according to the invention.
Figure 27:
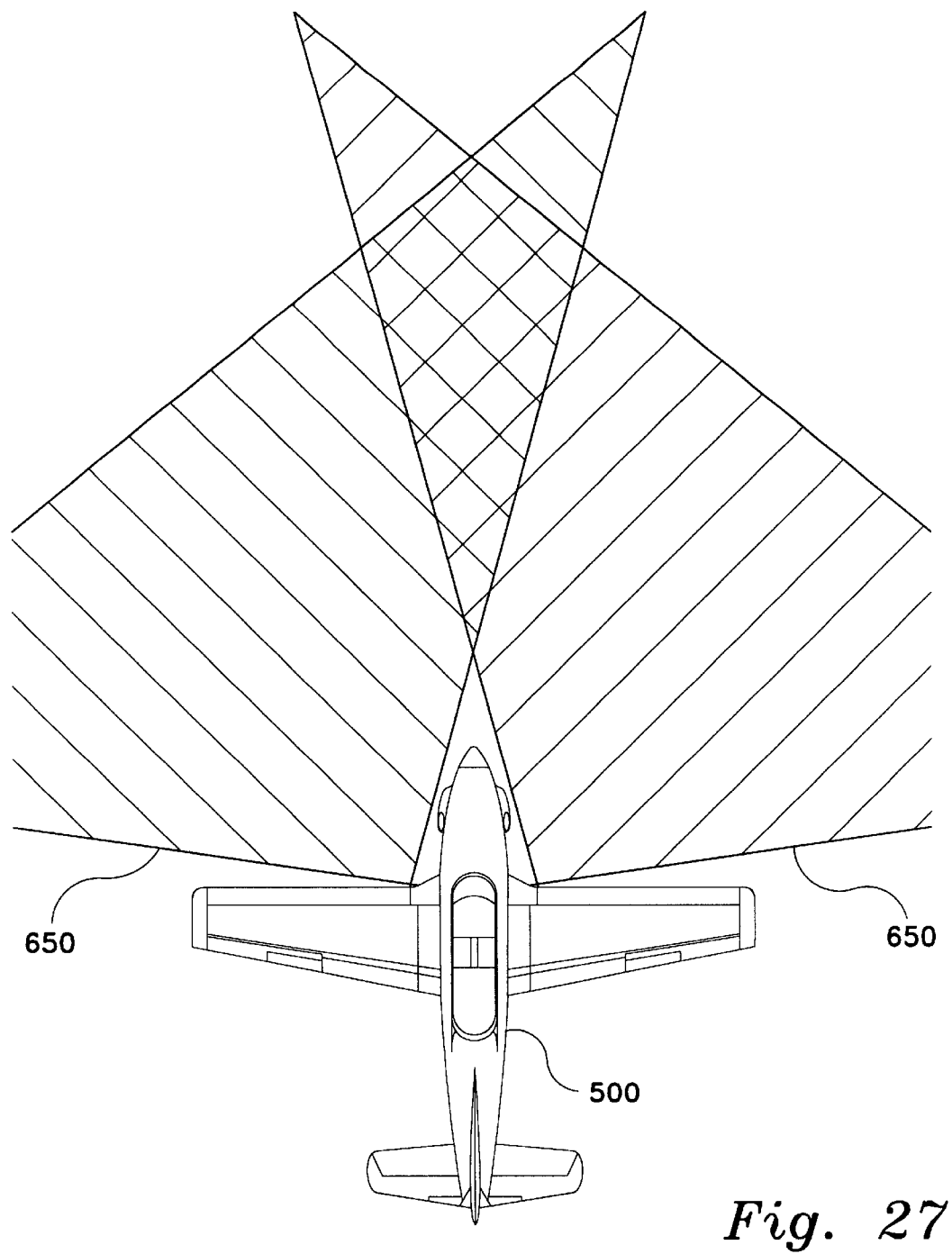
FIG. 27 is a top view of an aircraft equipped with a laser, scanning device according to the invention.
Figure 28:
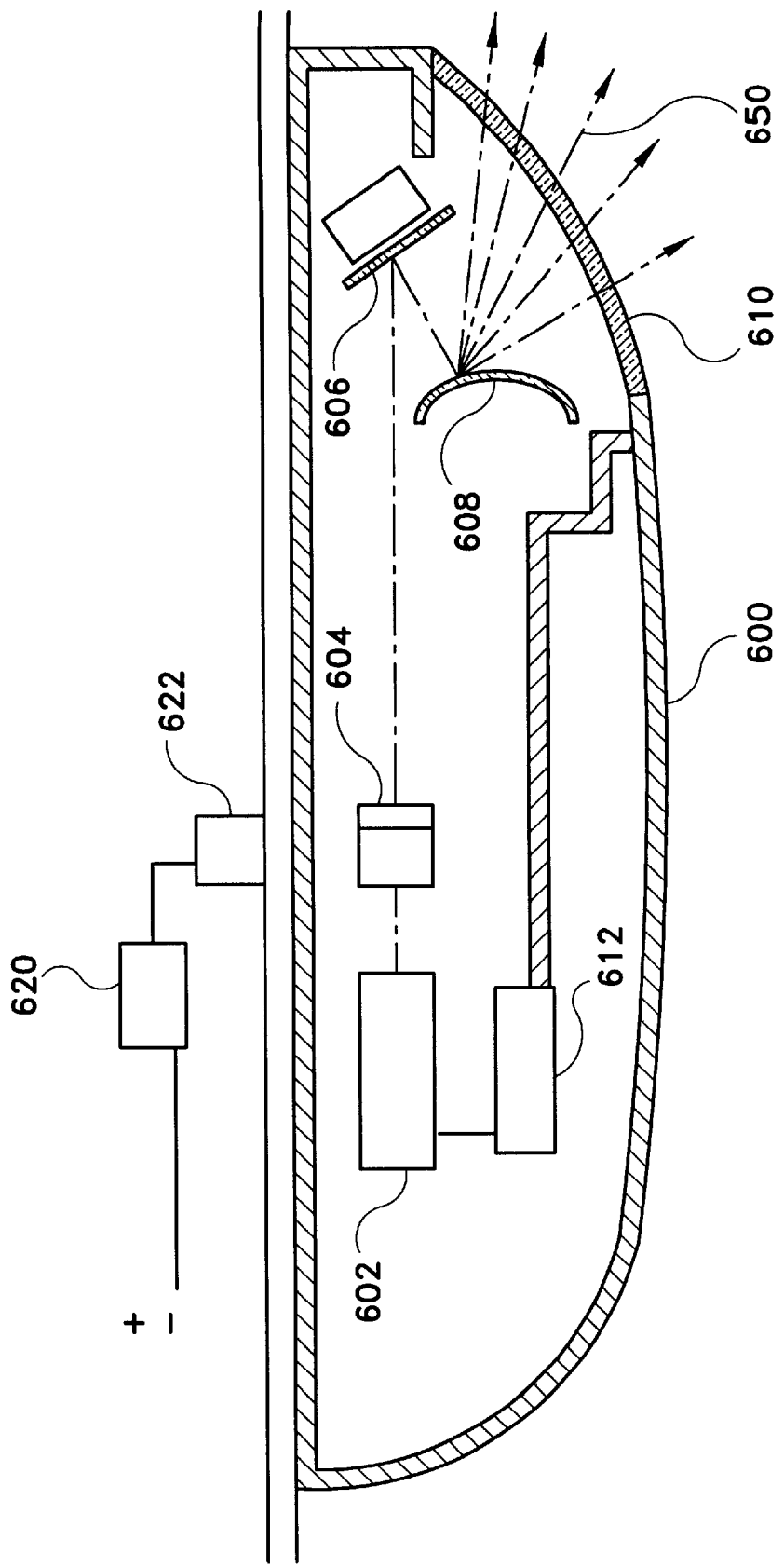
FIG. 28 is a side cross-sectional view of the laser, scanning device shown in FIGS. 26 and 27.
Figure 29:
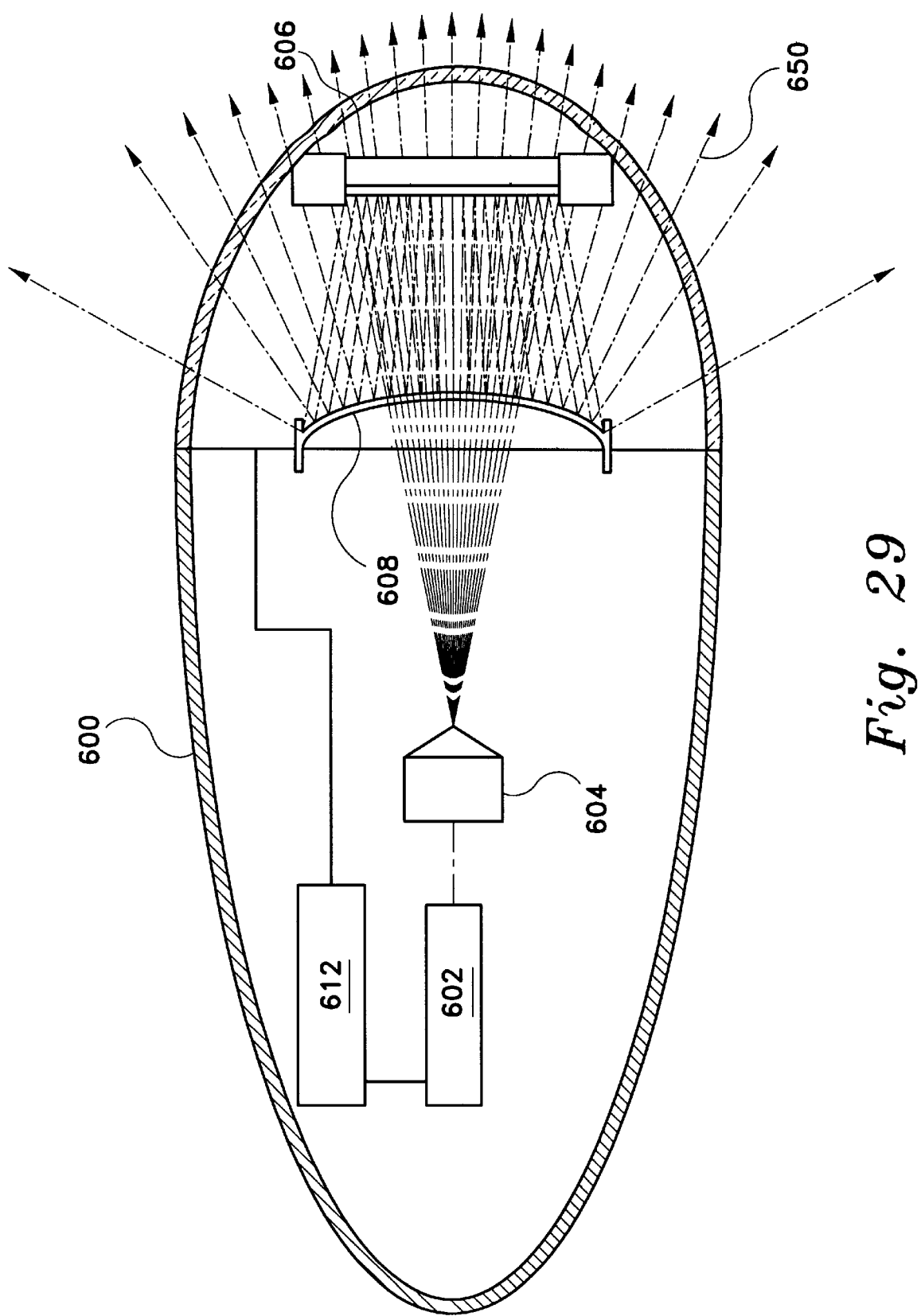
FIG. 29 is a top cross-sectional view of the laser, scanning device shown in FIGS. 26 and 27.

Another laser lighting post according to the invention may be equipped with a radar device for providing pulses of radiation along a surface based on the detected ground speed of an approaching aircraft. As shown in FIG. 20, a laser lighting post 324 equipped with a radar device and positioned along the centerline of a runway 320 transmits a radar 326, upon which the speed of the aircraft 322 may be determined. The laser lighting post 324 then transmits a pulsed laser sequence 328 relative to the speed of the oncoming aircraft 322. The crew on the aircraft 322 would perceive these pulses as standard airport centerline striping. This pulsed laser sequence could be utilized throughout an entire airport system on runways, taxiways, stop bar lines, hold short lines and other controlling situations. Details of such a laser lighting post are shown in FIGS. 23, 24, and 25. The radar device mounted on the laser lighting post 324 transmits a radar 326 that returns upon hitting the aircraft 322, upon which the speeds of the aircraft may be determined. The laser lighting post 380 includes a mounting column 382 which has an access door for providing access to a tilt switch assembly and an AC/DC power adapter unit. The mounting column 382 is attached to a base plate 386 by a frangible coupling 384. A top element 388 is mounted to the top of the mounting column 382. The top element 388 includes one laser 400 for producing pulsed beams of coherent visible or reflective radiation relative to the ground speed of an approaching aircraft. The laser 400 includes a glass plano-convex cylindrical lens which has an aspherical convex cylindrical surface for generating a laser line which is uniformally illuminated from end to end. The laser lighting post 380 may also be provided with adjustable shields as described above. The laser lighting post generates a pulsed laser sequence by interconnecting a microprocessor 408 with a motor 406 attached to a perforated disk 410. The microprocessor 408 controls the speed of the motor 406 according to the speed of a detected vehicle. The perforated disk 410 rotates at the motor speed and is pulsed means of the slot in the disk 410.

FIGS. 26–31 illustrate vehicles equipped with a laser scanning device according to the invention. This laser scanning device can be mounted to any motorized vehicle or can also be hand held and used from these vehicles or on foot. FIGS. 26–29 show such a laser scanning device provided on an aircraft 500. This laser scanning system incorporates a laser 602, a glass piano lens 604, a fixed mirror 608, an oscillating mirror 606, a temperature controlling device, a case 600, a clear glass cover 610, and a mounting means for securing the device to a motorized vehicle such as an aircraft, helicopter, truck, automobile, boat, or the like. This laser device may also be hand held and used from these vehicles for the purpose of illumination.

Figure 30:
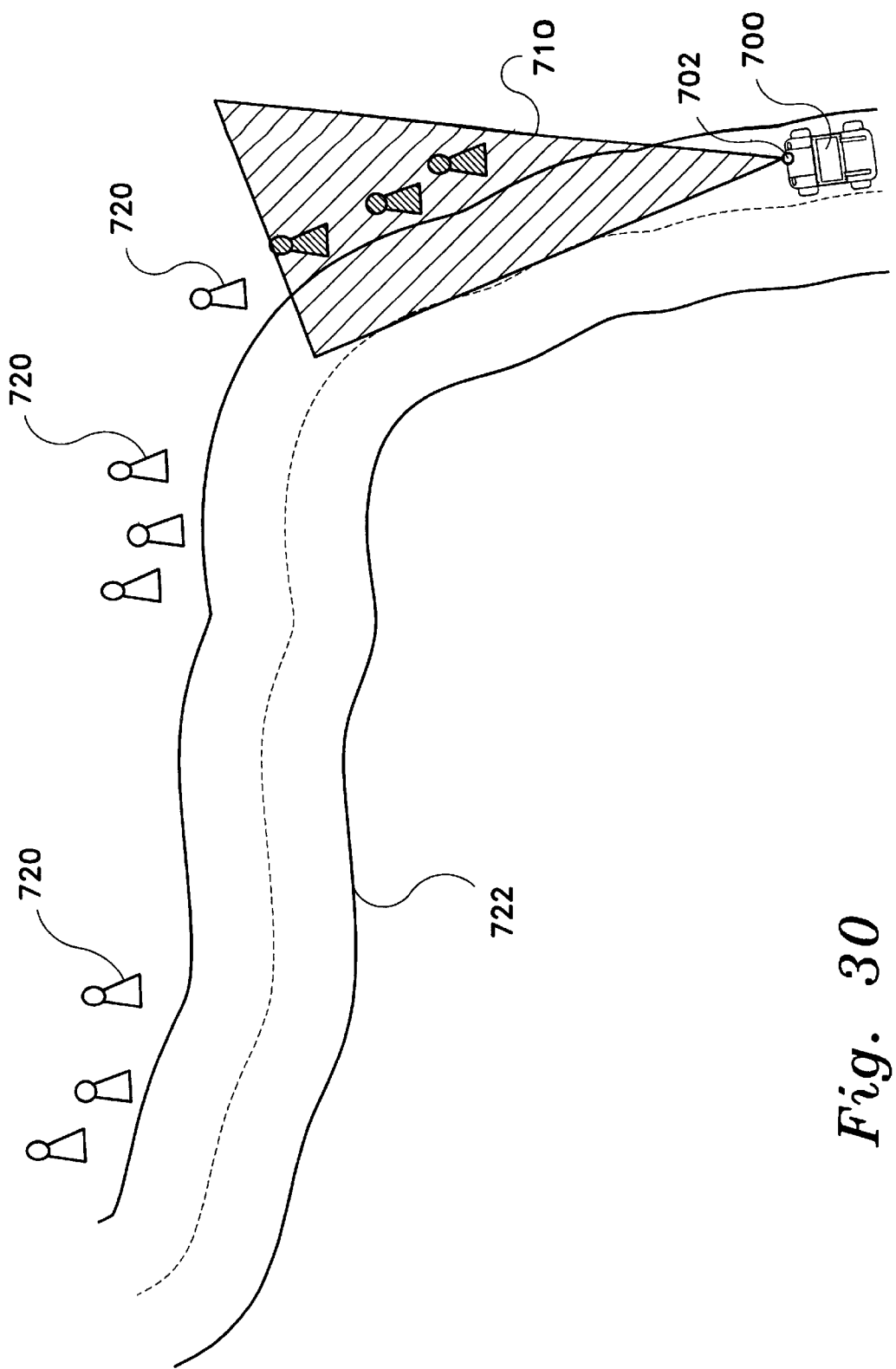
FIG. 30 is a top view of a ground vehicle, such as a car or truck, equipped with a laser, scanning device according to the invention.
Figure 31:
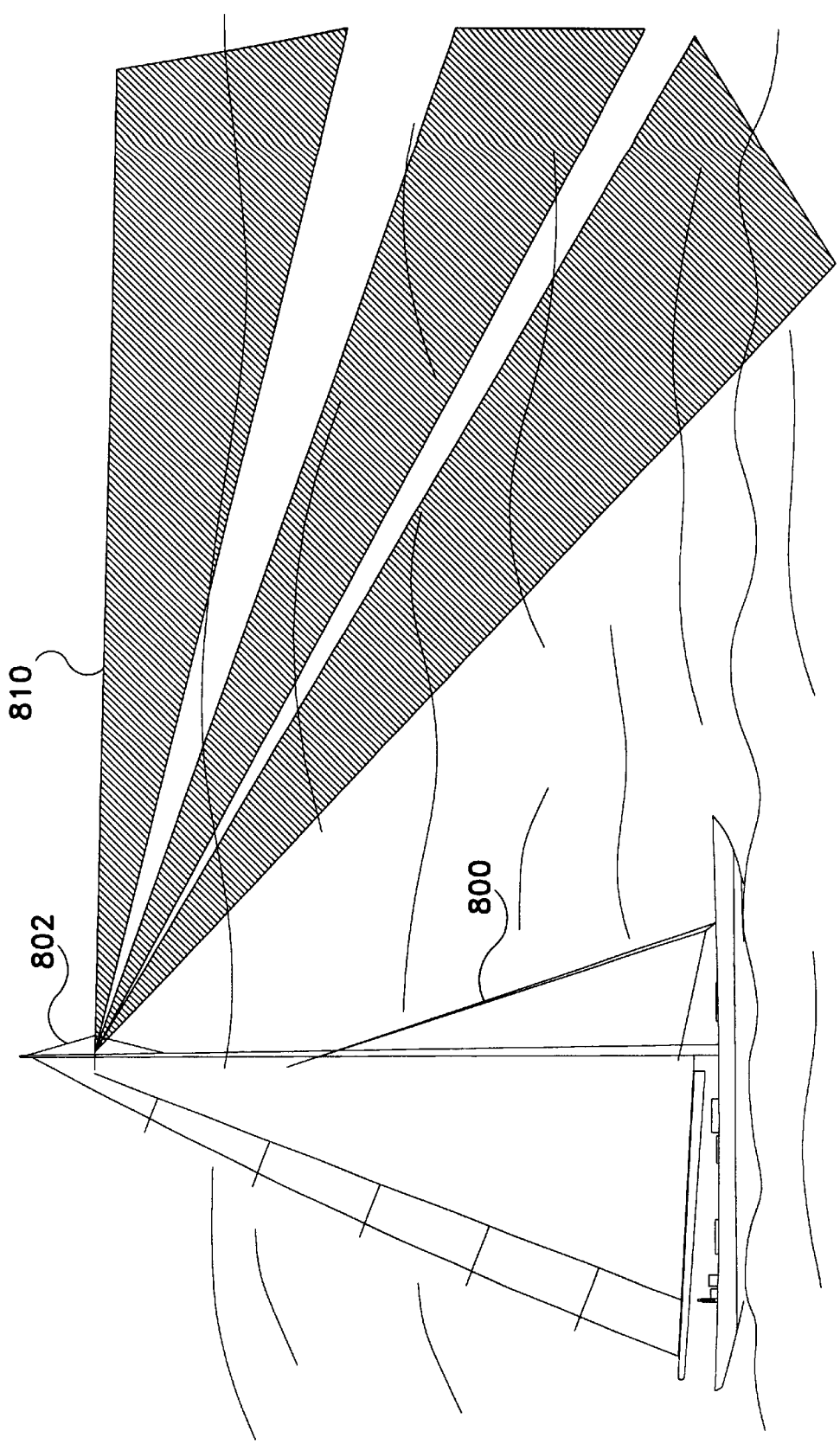
FIG. 31 is a side view of a boat equipped with a laser, scanning device according to the invention.

Power is supplied from a power source through a power connector to a laser. The laser outputs radiation which passes through a lens and is generated into a horizontally expanding line beam of radiation that strikes an oscillating mirror. A vertically oscillating, horizontally expanding line beam of radiation that reflects off of the oscillating mirror is reflected off of a fixed mirror. The horizontal expansion of the line beam of radiation is regulated by changing the angle ground on a glass plano lens or by adjusting the distance of the laser and the lens from the oscillating mirror, and by adjusting the distance of the oscillating mirror from the fixed mirror. Changes to the horizontal and/or vertical radius of the fixed mirror will further regulate the vertical oscillation and the horizontal expansion of the line generated beam of radiation. The vertical oscillation of the horizontally expanding beam of radiation is controlled by the distance of the oscillating mirror from the fixed mirror. The frequency of the vertical oscillations is controlled by regulation of the voltage applied to the oscillating mirror driver. The direction of the vertically oscillating, horizontally expanding beam of radiation emitted through the heated glass window of the mounted laser scanner can be regulated by adjusting the angle of the vertical oscillating mirror to the fixed mirror on the horizontal plane. The vertically oscillating horizontially expanding line beam of radiation is subsequently reflected through a heated glass window. A temperature control regulates the temperature of the heated glass window to clear ice and frost from the glass window. FIG. 30 shows a similar a laser scanning device provided on an motorized vehicle such as a car or truck. FIG. 31 shows a similar a laser scanning device provided on an motorized vehicle such as a boat. In any case, the laser scanning oscillates and emits a vertically oscillating, horizontally expanding line beam of radiation. Such a vertically oscillating, horizontally expanding line beam of radiation.

The laser scanning device shown in FIGS. 26–31 addresses a system of beam shaping, delivery, and the retroreflection of laser light on specially designed markers to reduce the problems associated with the illumination of markings, signage, and reflectors installed in northern climates. Retroreflective systems for the illumination of airports, highways, marine waterways, obstructions, and parking lots will become increasingly popular as the source of light is now supplied by the user. This illumination, in the form of landing lights, headlights, searchlights, flashlights, and in this case, a mobile laser lighting system, is a proven cost effective method of providing illumination at these sites. Conventional reflectors have flat surfaces and due to the properties of retroreflective materials the source of illumination must be within in a few degrees of perpendicular to the reflector to properly function. Sources of illumination at greater angles to the reflector produce little or no retroreflection back to the source. With the ability of this laser scanning system to illuminate all retroreflective markers in a given area from any direction regardless of the direction of travel of the vehicle, the present invention additionally includes a specially designed omni-directional retroreflective marker.

FIGS. 26–29 illustrate a plane 500 equipped with a laser, scanning device 600 which emits a laser light 650. The scanning device 600 can be mounted to any motorized vehicle or can also be hand held and used from these vehicles or on foot. Power is supplied to a laser 602 via means of a power source through a power connector 622. The radiation emitted from the laser 602 passes through a lens 604, and is generated into a horizontally expanding line beam of radiation striking an oscillating mirror 606. The vertically oscillating, horizontally expanding beam of radiation is reflected from a fixed mirror 608 and passes through a heated glass window 610. The horizontal expansion of the line beam of radiation is regulated by changing the angle ground on the glass plano lens 604, or by adjusting the distance of the laser 602 and lens 604 from the oscillating mirror, and by adjusting the distance of the oscillating mirror 606 from the fixed mirror 608. Changes to the horizontal and/or vertical radius of the fixed mirror 608 will further regulate the vertical oscillation and the horizontal expansion of the line generated beam of radiation.

The vertical oscillation of the horizontally expanding beam of radiation is controlled by the distance the oscillating mirror from the fixed mirror 608. The frequency of the vertical oscillations is controlled by the regulation of the voltage supplied to the oscillating mirror driver. The direction of the vertically oscillating, horizontally expanding beam of radiation emitted through the heated glass window 610 of the mounted laser 602 can be regulated by adjusting the angle of the vertically oscillating mirror on the horizontal plane. A temperature control 612 regulates the temperature of the heated glass window 610 to clear ice and frost from the glass window 610.

FIG. 30 illustrates a laser scanning device 702 mounted on a car 700 as it drives along a roadway 722. The laser scanning device 702 emits an expanding beam of laser light 710 which is used to reflect off of reflectors 720 mounted along the side of the roadway 722. FIG. 31 illustrates a laser scanning device 802 mounted on a boat 800 as passes along a waterway. The laser scanning device 802 emits an expanding beam of laser light 810 which is used to reflect off of land oriented reflectors (not shown) any type of reflective material (not shown).

Airports, marine waterways, highways and obstructions, and other areas that are subject to accumulations of snow covering retroreflective markings require a removal processes that is normally done by heavy equipment such as plows, tractors, graders, snow blowers, etc. This process is especially labor intensive since the snow left in areas between and around the reflectors not accessible by the equipment must be removed by hand. Reflective devices that are presently in use are either attached permanently to the surface for alignment purposes, or weighted down to prevent them from blowing away, resulting in drifted snow, buried reflectors, and missing or damaged markers.

Figure 32:
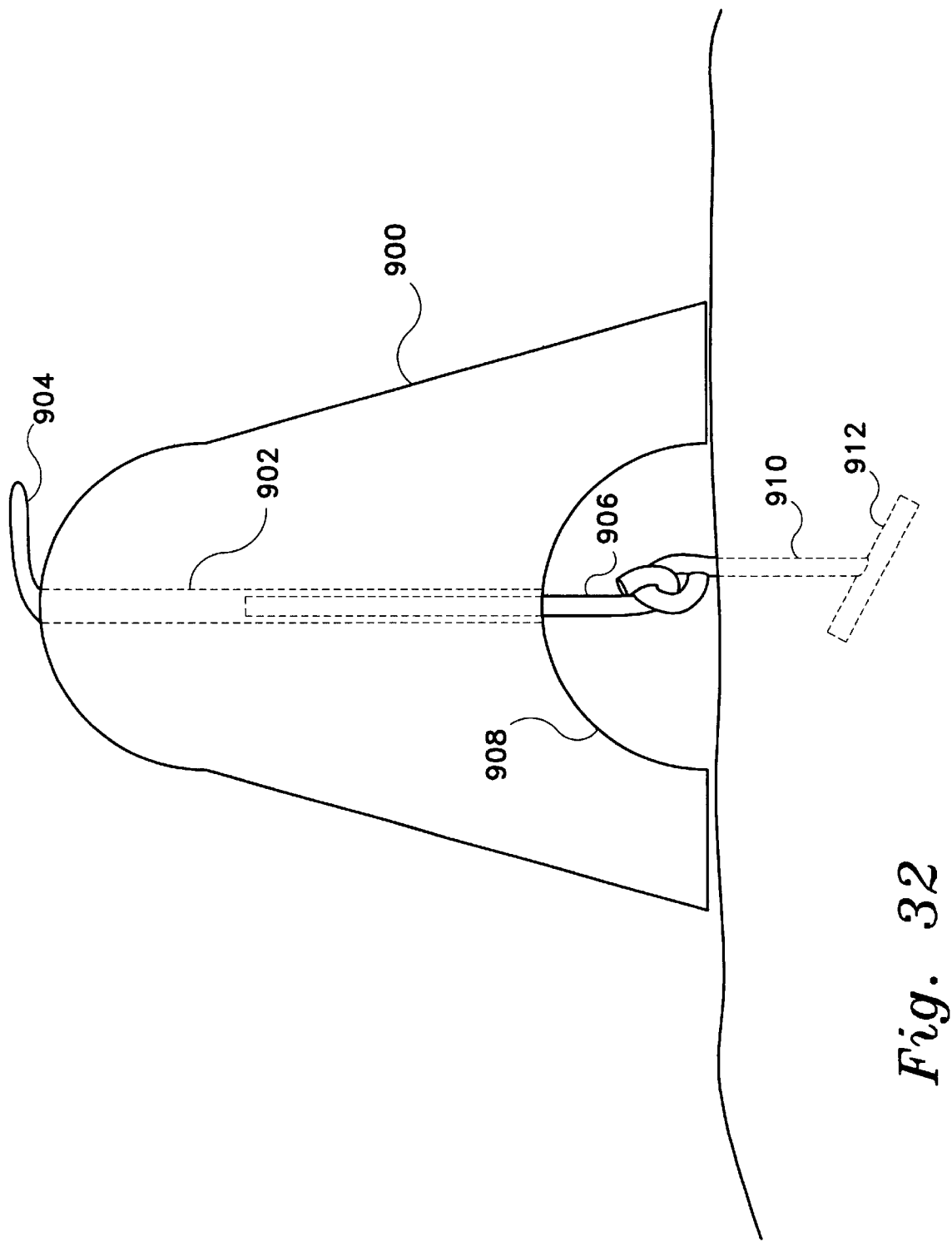
FIG. 32 is a side view of an omni-directional retroreflector according to the invention.
Figure 33A:
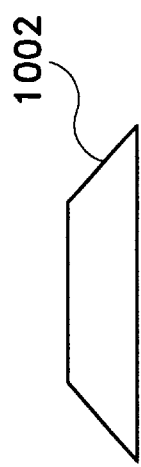
FIGS. 33A, 33B, and 33C show elements of the omni-directional retroreflector shown in FIG. 32.
Figure 33B:
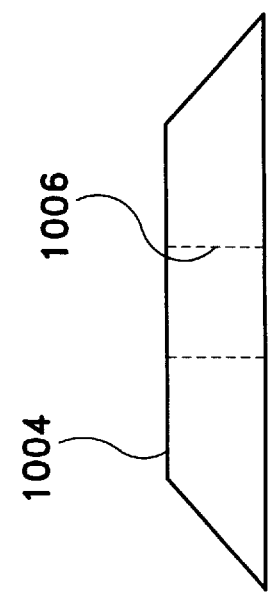
Figure 33C:
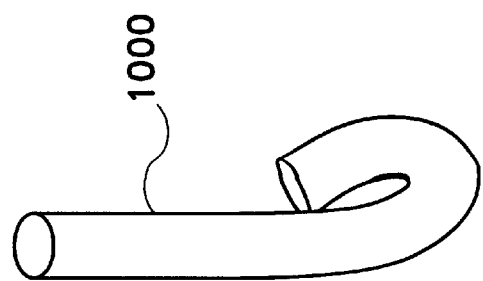
Figure 34:
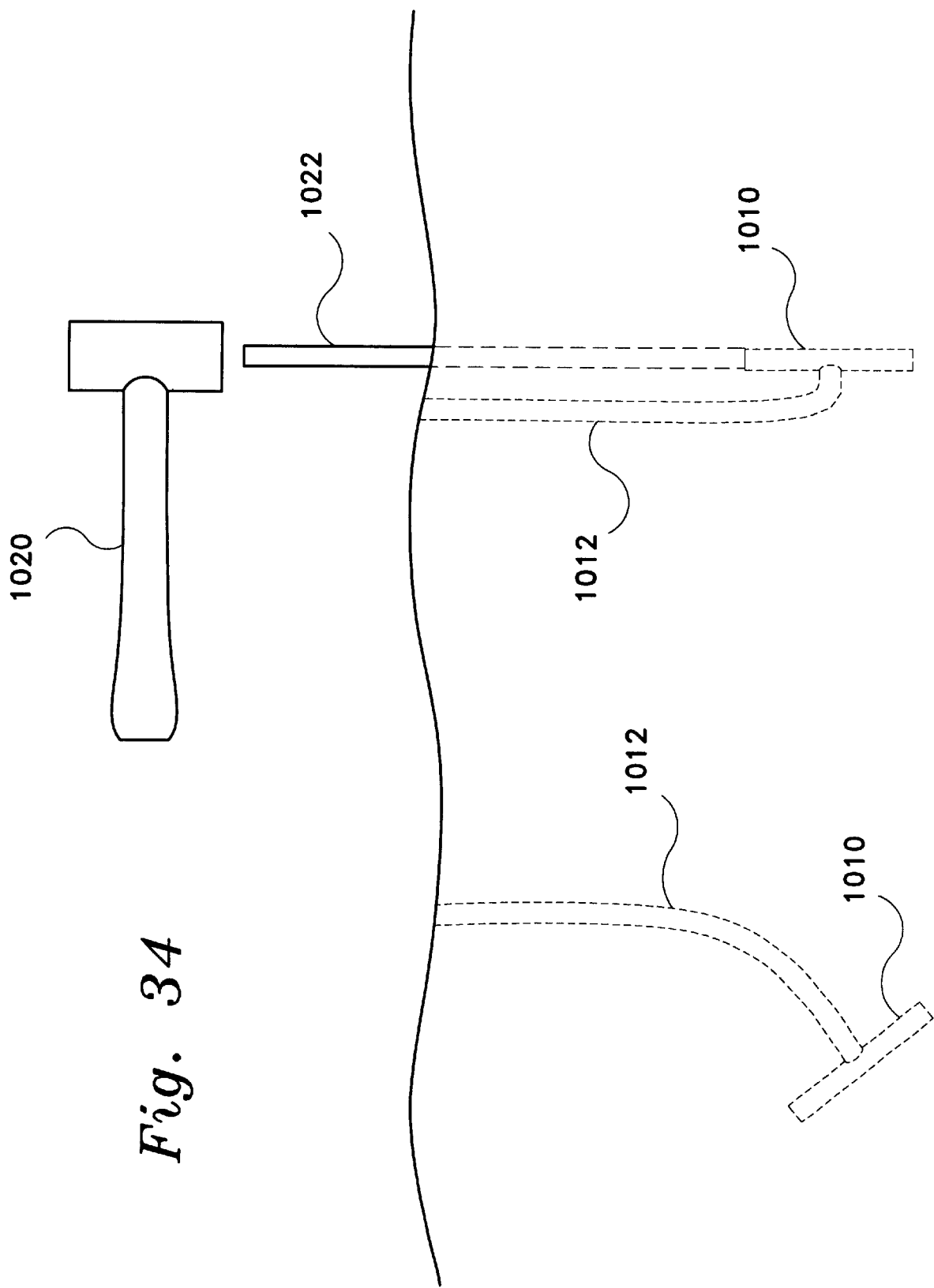
FIG. 34 show elements of the omni-directional retroreflector shown in FIG. 32.

The inventive laser lighting system addresses these problems by incorporating an omni-directional, retroreflective marker which is not permanently installed thus making replacement, maintenance and snow removal much easier. These markers are held in place by attaching a strap with a frangible connector to protruding cable loops that are anchored above or below the surface at specific intervals, as shown in FIGS. 32–34. The strap 902 goes through small opening in the top of the reflector and is cinched down 904 by a special friction device on the strap 902. The placement of this omni-directional retroreflector marker 900 is not dependent on a specific alignment and is easily re-installed upon completion of the snow removal or construction process. The protruding cable loops are not affected by the snow removal equipment and remain visible to reattach the reflectors in the proper location. Should the retroreflective markers be removed from the location the cable loops are easily removed from the surface. The omni-directional, retroreflective marker used with the laser scanning system has a conical shape with a rounded top to shed any accumulation of snow. This shape has a large surface area to apply retro-reflective tapes or paints. The omni-directional retroreflective marker incorporates in its design large open areas at the base of the marker. This feature eliminates snow drifting as the wind is allowed to carry the airborne snowflakes through the marker and beyond rather than accumulate as a snowdrift in the dead air space behind the marker. These omni-directional retroreflective markers will work in any climate on land or water, above and below the surface. The reflector incorporates a locking mechanism that allows the strap to be tightened or cinched in one direction. A push to release feature unlocks the strap. This strap is made of nylon webbing and is preferably orange in color for identification. The basic shape of the omni-directional retroreflective marker is conical to provide structural integrity and shed snow accumulations and provide a large surface area for the application of retroreflective tapes and paint. The measurements are proportionate and they are available in different sizes. The frangible hook is designed to break preventing damage to the reflector or a vehicle, but is strong enough to withstand designed wind loads. The anchor cable is driven into the surface. The frangible hook attaches to the loop formed this cable. The cutout areas in the base of the cone elevate the marker and prevent blowing snow or sand from drifting and accumulating behind the reflector. The remaining bottom portion of the cone form feet that the marker rests on. The frangible hook is attached to the strap. The strap is fed through the strap cinch. The top surface of strap cinch device is covered with retroreflective tape or paint. A cable loop protrudes above the surface. A cable attached to a cable anchor. The cable anchor is driven into the ground.

It is to be understood that the present invention is not limited to the embodiments described above, but encompasses any and all embodiments within the scope of the following claims.

I claim:

1. An omnidirectional, retroreflective marker comprising:

a conical structure;

a locking mechanism;

a strap;

a strap cinch;

an anchor cable; and, a frangible hook attached to the strap.

2. The omnidirectional, retroreflective marker according to claim 1, further comprising a laser lighting device for providing radiation along a surface, said laser lighting device comprising:

a laser;

a glass plano lens;

a fixed mirror;

an oscillating mirror;

a temperature controlling device;

a case;

a clear glass cover;

power connection means; and, a mounting means for securing the device to a motorized vehicle.

3. The omnidirectional, retroreflective marker according to claim 2, further comprising a motorized vehicle.

4. The omnidirectional, retroreflective marker according to claim 3, wherein said motorized vehicle is an aircraft.

5. The omnidirectional, retroreflective marker according to claim 3, wherein said motorized vehicle is a helicopter.

6. The omnidirectional, retroreflective marker according to claim 3, wherein said motorized vehicle is a truck.

7. The omnidirectional, retroreflective marker according to claim 3, wherein said motorized vehicle is an automobile.

8. The omnidirectional, retroreflective marker according to claim 3, wherein said motorized vehicle is a boat.

* * * * *